US012573244B2

(12) United States Patent
Lee et al.

(10) Patent No.: US 12,573,244 B2
(45) Date of Patent: Mar. 10, 2026

(54) ETCS-SUPPORTING INTEGRATED DIGITAL REAR MIRROR DEVICE AND OPERATING METHOD THEREOF

(71) Applicant: THINKWARE CORPORATION, Seongnam-si (KR)

(72) Inventors: Ho Kwan Lee, Seongnam-si (KR); Hyun Jin Bang, Seongnam-si (KR); Tae Hyeong Kim, Seongnam-si (KR); Sung Rak Choi, Seongnam-si (KR); Hyun Chul Cho, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 0 days.

(21) Appl. No.: 18/898,525

(22) Filed: Sep. 26, 2024

(65) Prior Publication Data

US 2025/0104484 A1     Mar. 27, 2025

(30) Foreign Application Priority Data

| | | |
|---|---|---|
| Sep. 27, 2023 | (KR) ......................... | 10-2023-0130288 |
| Nov. 27, 2023 | (KR) ......................... | 10-2023-0166564 |
| Sep. 11, 2024 | (KR) ......................... | 10-2024-0124066 |

(51) Int. Cl.
*G07B 15/06* (2011.01)
*B60K 35/215* (2024.01)
(Continued)

(52) U.S. Cl.
CPC .......... *G07B 15/063* (2013.01); *B60K 35/215* (2024.01); *G06Q 20/327* (2013.01);
(Continued)

(58) Field of Classification Search
CPC .. G07B 15/063; B60K 35/215; G06Q 20/327; G06Q 20/351; G06Q 2240/00
(Continued)

(56) References Cited

U.S. PATENT DOCUMENTS

| | | | | |
|---|---|---|---|---|
| 7,224,324 | B2 * | 5/2007 | Quist ........................ | B60R 1/12 |
| | | | | 359/267 |
| 2009/0096937 | A1 * | 4/2009 | Bauer ........................ | B60R 1/12 |
| | | | | 348/739 |

(Continued)

OTHER PUBLICATIONS

Audi of America "Audi e-tron will be first model to feature vehicle-integrated toll module technology" <https://media.audiusa.com/releases/263> (Sep. 10, 2018). (Year: 2018).*

(Continued)

*Primary Examiner* — Michael P Harrington
*Assistant Examiner* — Brian A Tallman
(74) *Attorney, Agent, or Firm* — ZION IP; Byungwoong Park

(57) ABSTRACT

The present disclosure provides an electronic toll collection system (ETCS)-supporting integrated digital rear mirror device and an operating method thereof. According to an example embodiment, the digital rear mirror device may include a digital rear mirror module configured to provide a rear view of a vehicle within a single housing and an ETCS module for electronic toll collection for the vehicle. A substrate of the digital rear mirror module and a substrate of the ETCS module may be separately arranged rather than being stacked within the digital rear mirror device. According to another example embodiment, the ETCS module may transmit information received from an external device to the digital rear mirror module, and the digital rear mirror module may display the information while providing the rear view. Here, the information may include at least one of billing information, event information, traffic information, environmental information, and disaster situation information.

12 Claims, 12 Drawing Sheets

(51) Int. Cl.
*G06Q 20/32*      (2012.01)
*G06Q 20/34*      (2012.01)

(52) U.S. Cl.
CPC ........... *G06Q 20/34* (2013.01); *G06Q 20/351* (2013.01); *G06Q 2240/00* (2013.01)

(58) Field of Classification Search
USPC .......................................................... 705/13
See application file for complete search history.

(56) References Cited

U.S. PATENT DOCUMENTS

| | | | |
|---|---|---|---|
| 2013/0170013 A1* | 7/2013 | Tonar ....................... | G02F 1/161 |
| | | | 359/296 |
| 2013/0222156 A1* | 8/2013 | Colburn, III ........... | G08G 1/017 |
| | | | 340/928 |
| 2015/0302738 A1* | 10/2015 | Geerlings .......... | G07C 9/00571 |
| | | | 340/5.25 |
| 2017/0113619 A1* | 4/2017 | Boehm .................. | G07B 15/06 |
| 2017/0364719 A1* | 12/2017 | Boehm .............. | G06K 7/10366 |
| 2022/0250547 A1* | 8/2022 | Hong ...................... | B60R 1/088 |
| 2023/0114340 A1* | 4/2023 | Imai ....................... | H04N 23/69 |
| | | | 348/118 |
| 2024/0182024 A1* | 6/2024 | Inoue ................... | B60W 30/10 |

OTHER PUBLICATIONS

Audi "Audi e-tron will be first model to feature vehicle-integrated toll module technology" <https://media.audiusa.com/releases/263> (Sep. 10, 2018 press release) (Year: 2018).*

* cited by examiner

ETCS-SUPPORTING INTEGRATED DIGITAL REAR MIRROR DEVICE AND OPERATING METHOD THEREOF

CROSS-REFERENCE TO RELATED APPLICATION(S)

This application claims the priority benefit under 35 U.S.C. § 119 to Korean Patent Application No. 10-2023-0130288, filed on Sep. 27, 2023, Korean Patent Application No. 10-1023-0166564, filed on Nov. 27, 2023, and Korean Patent Application No. 10-2024-0124066, filed on Sep. 11, 2024, in the Korean Intellectual Property Office, the entire contents of which are incorporated herein by reference in their entirety.

BACKGROUND

1. Field

The present disclosure relates to an electronic toll collection system (ETCS)-supporting integrated digital rear mirror (DRM) device and an operating method thereof.

2. Description of Related Art

An ETCS that refers to an electronic toll collection system is a system that automatically collects tolls, such as passage tolls and congestion tolls, from vehicles passing through toll roads or bridges. In detail, the ETCS includes an ETCS terminal mounted to a vehicle, an ETCS relay device installed at an arbitrary location to communicate with the ETCS terminal when the vehicle passes through that location, and an ETCS server connected to the ETCS relay device to collect toll from the vehicle through the ETCS relay device. As such, to implement the ETCS, the ETCS terminal needs to be mounted to the vehicle. This ETCS terminal needs to be mounted to the vehicle to perform smooth communication with the ETCS relay device and to not spoil the aesthetics of the vehicle.

SUMMARY

The present disclosure provides an electronic toll collection system (ETCS)-supporting integrated digital rear mirror device and an operating method thereof.

In the present disclosure, a digital rear mirror device of a vehicle may include a digital rear mirror module configured to provide a rear view of the vehicle, and an electronic toll collection system (ETCS) module arranged separate from the digital rear mirror module within the digital rear mirror device and configured for electronic toll collection for the vehicle.

In the present disclosure, a digital rear mirror device of a vehicle may include a display module, and a processor configured to connect to the display module and to display information received through an ETCS module configured for electronic toll collection for the vehicle, while providing a rear view of the vehicle through the display module.

In the present disclosure, an operating method of a digital rear mirror device of a vehicle may include providing, by a digital rear mirror module, a rear view of the vehicle, and supporting, by an electronic toll collection system (ETCS) module arranged separate from the digital rear mirror module within the digital rear mirror device, electronic toll collection for the vehicle.

In the present disclosure, an operating method of a digital rear mirror device of a vehicle may include providing a rear view of the vehicle through a display module, and displaying information received through an ETCS module configured for electronic toll collection for the vehicle while providing the rear view through the display module.

According to the present disclosure, a digital rear mirror device may provide a rear view of a vehicle and may also support electronic toll collection. Therefore, the digital rear mirror device may be mounted to the vehicle to perform smooth communication with an ETCS relay device and to not spoil aesthetics of the vehicle. Here, the digital rear mirror device may include an ETCS module with a digital rear mirror module within a single housing, and particularly, substrates that implement the digital rear mirror module and the ETCS module, respectively, may be separated from each other and arranged within the housing. Therefore, a thickness of the digital rear mirror device may be reduced, which may reduce a space occupied by the digital rear mirror device in the vehicle, thereby improving space utilization of the vehicle (V) and flexibility for the design of the digital rear mirror device. In addition, overheating of the digital rear mirror device may be prevented.

According to the present disclosure, a digital rear mirror device may display information received through an ETCS module while providing a rear view of a vehicle. Through this, the digital rear mirror device allows a driver to intuitively grasp the information while looking ahead during driving.

DETAILED DESCRIPTION

Hereinafter, various example embodiments of the present document are described with reference to the accompanying drawings.

Figure 1:
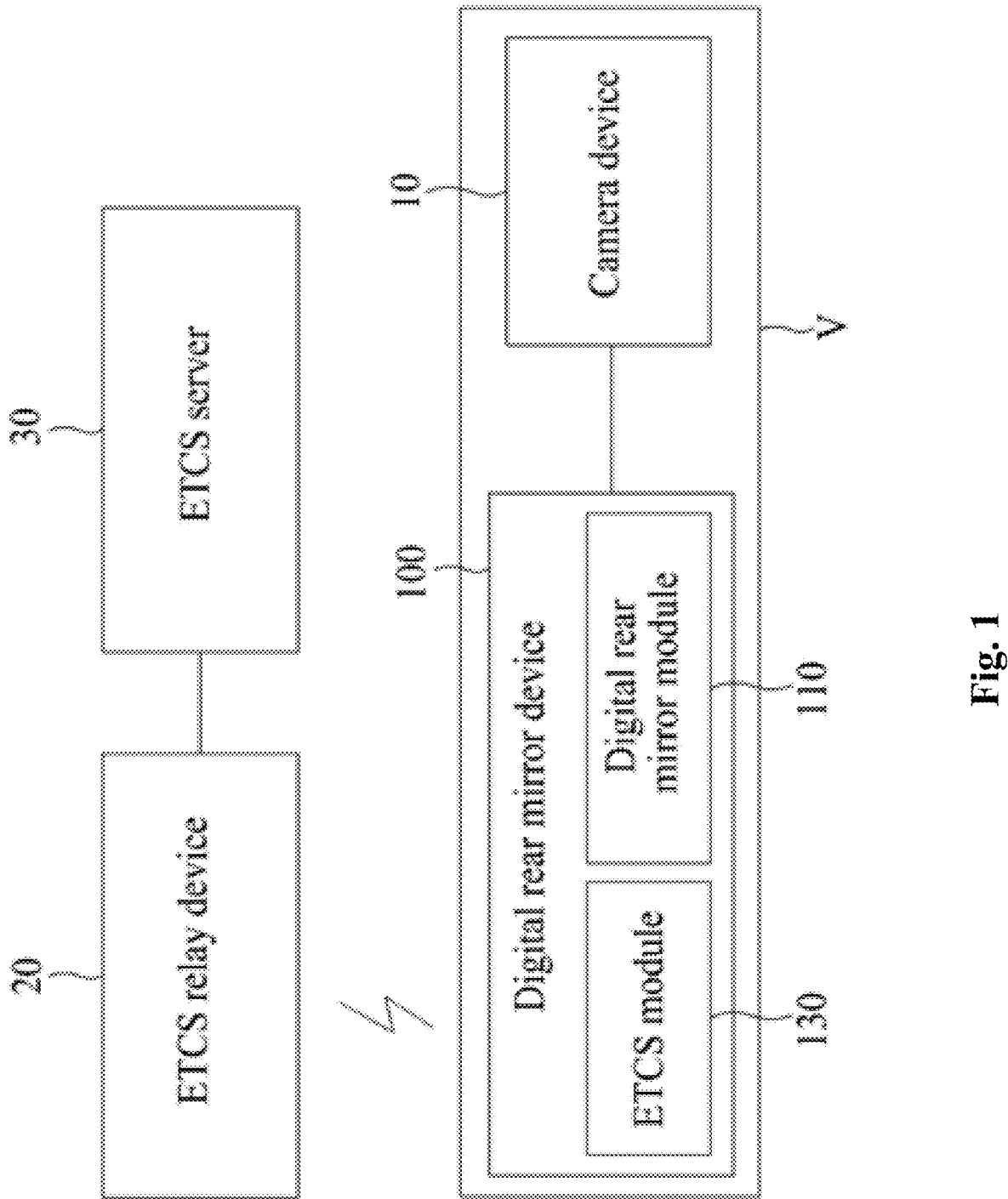
FIG. 1 is a diagram illustrating a system that includes a digital rear mirror device according to various example embodiments.
Figure 2:
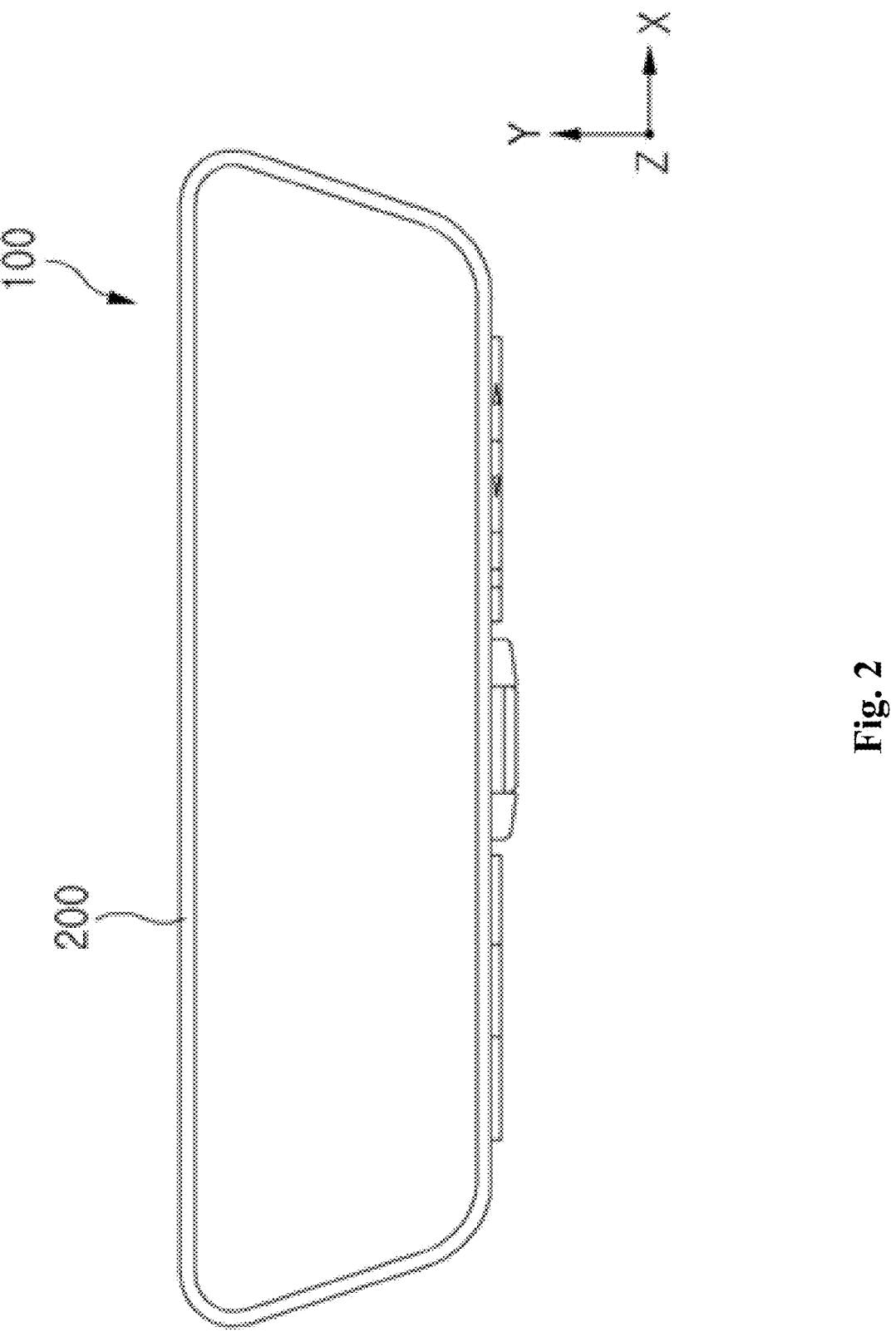
FIG. 2 illustrates an example of the digital rear mirror device of FIG. 1.

FIG. 1 is a diagram illustrating a system that includes a digital rear mirror device 100 according to various example embodiments. FIG. 2 illustrates an example of the digital rear mirror device 100 of FIG. 1.

Referring to FIG. 1, the digital rear mirror device 100 may be mounted to a vehicle (V) with at least one camera device 10. For example, as shown in FIG. 2, the digital rear mirror device 100 may be implemented within a single housing 200 and mounted within the driver's field of view range. The digital rear mirror device 100 may include a digital rear mirror module 110 and an electronic toll collection system (ETCS) module 130.

The digital rear mirror module 110 may display video information acquired by the camera device 10. To this end, the digital rear mirror module 110 may be connected to the camera device 10. The camera device 10 may acquire video information on a surrounding environment of the vehicle (V). In some example embodiments, the camera device 10 may store the video information in a memory within the camera device 10. The video information may include a rear view video of the vehicle (V). To this end, the camera device 10 may be mounted on the back of the vehicle (V) to face the rear of the vehicle (V). In some example embodiments, the video information may include a front view video of the vehicle (V). To this end, the camera device 10 may be mounted on the front of the vehicle (V) to face the front of the vehicle (V).

The camera device 10 and the digital rear mirror module 110 may be communicatively connected in a wired or wireless manner. In some example embodiments, the camera device 10 and the digital rear mirror module 110 may be connected through a communication cable. In an example embodiment, the camera device 10 and the digital rear mirror module 110 may communicate with each other using an analog method. The analog method may include, for example, analogue high definition (AHD). In another example embodiment, the camera device 10 and the digital rear mirror module 110 may communicate with each other using a digital method. For example, the digital method may include a serial transmission method. In this case, the camera device 10 may include a serializer, and the digital rear mirror module 110 may include a deserializer. However, without being limited thereto, the camera device 10 and the digital rear mirror module 110 may be connected through an in-vehicle (V) network communication (e.g., controller area network (CAN) communication). The camera device 10 and the digital rear mirror module 110 may include various communication chips.

In some example embodiments, a video processing device (not shown) may be added between the camera device 10 and the digital rear mirror module 110. In this case, the video processing device may process video information acquired by the camera device 10 and may transmit the processed video information to the digital rear mirror module 110. In an example embodiment, the video processing device may store the video information in a memory within the video processing device. In another example embodiment, the video processing device may crop a portion of the video information. In still another example embodiment, the video processing device may enlarge at least a portion of the video information.

In various example embodiments, the digital rear mirror module 110 may provide a rear view of the vehicle (V). The digital rear mirror module 110 may operate in at least one of a mirror mode and a display mode. In the mirror mode, the digital rear mirror module 110 may directly illuminate the rear view of the vehicle (V). In the display mode, the digital rear mirror module 110 may provide the rear view of the vehicle (V) by displaying the rear view video of the vehicle (V) acquired by the camera device 10. However, without being limited thereto, the digital rear mirror module 110 may provide a front view of the vehicle (V) by displaying the front view video of the vehicle (V) acquired by the camera device 10. The camera device 10 may capture the front view video. The camera device 10 may transmit the front view video to the digital rear mirror device 100 and accordingly, the digital rear mirror module 110 may display the front view video. In this case, the digital rear mirror module 110 may acquire information on the front of the vehicle (V) from the front view video. For example, when electronic toll collection for the vehicle (V) is required, the digital rear mirror module 110 may detect a lane in which the electronic toll collection is possible from the acquired front view video. Through this, the vehicle (V) may change its lane in advance to the lane in which the electronic toll collection is possible.

The ETCS module 130 may support the electronic toll collection for the vehicle (V). That is, when the vehicle (V) passes through a toll road or bridge, the ETCS module 130 may perform payment for toll collected for the vehicle (V). To this end, the ETCS module 130 may communicate with the ETCS relay device 20, and the ETCS relay device 20 may be connected to the ETCS server 30. The ETCS relay device 20 may relay between the ETCS module 130 and the ETCS server 30. In detail, the ETCS relay device 20 may be installed at a predetermined location, such as the toll road or bridge. The ETCS relay device 20 may detect the vehicle (V) that passes through the corresponding location, and may communicate with the ETCS module 130 of the vehicle (V). Here, the ETCS module 130 and the ETCS relay device 20 may communicate with each other using a wireless communication method. For example, the wireless communication method may include at least one of a radio frequency (RF) method and an infrared ray (IR) method. In the case of the radio frequency method, V-line propagation may be used. The ETCS server 30 may execute the electronic toll collection for the vehicle (V) from the ETCS module 130 through the ETCS relay device 20.

In various example embodiments, the ETCS module 130 may transmit information received from the ETCS relay device 20 to the digital rear mirror module 110. Accordingly, the digital rear mirror module 110 may display the corresponding information while providing the rear view. For example, the corresponding information may include at least one of billing information according to electronic toll collection, event information, traffic information, environmental information, and disaster situation information.

Figure 3:
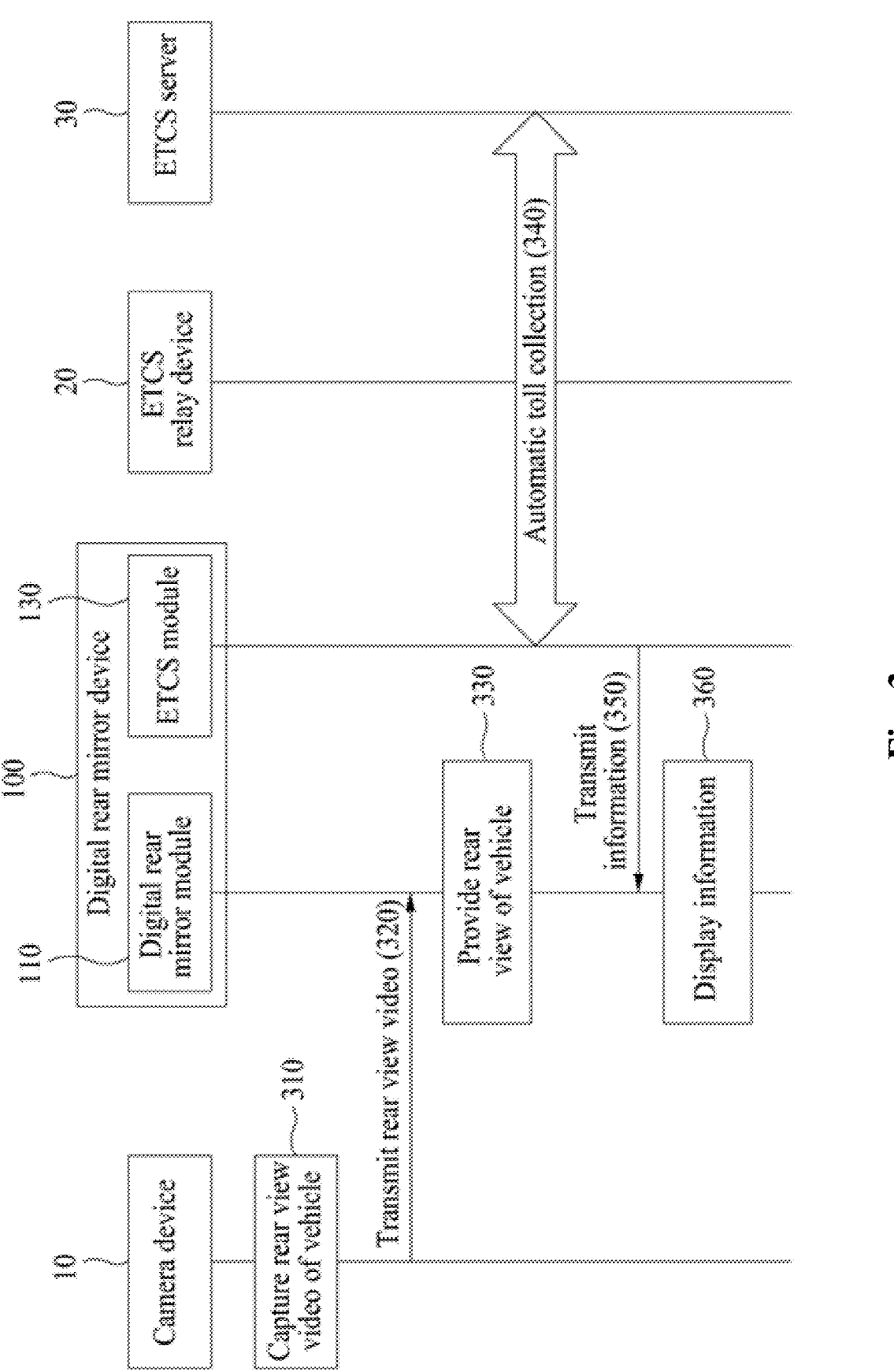
FIG. 3 is a flowchart illustrating a signal flow in the system of FIG. 1.

FIG. 3 is a flowchart illustrating a signal flow in a system that includes the digital rear mirror device 100 according to various example embodiments.

Referring to FIG. 3, in operation 330, the digital rear mirror module 110 of the digital rear mirror device 100 may provide a rear view of a vehicle (V). The digital rear mirror module 110 may operate in at least one of a mirror mode and a display mode, providing the rear view of the vehicle (V). Here, when operable in both the mirror mode and the display mode, the digital rear mirror module 110 may switch between the mirror mode and the display mode if necessary. In the mirror mode, the digital rear mirror module 110 may directly illuminate the rear view of the vehicle (V). Meanwhile, in the display mode, the digital rear mirror module 110 may provide the rear view of the vehicle (V) by displaying the rear view video of the vehicle (V). In this case, the camera device 10 may capture the rear view video of the vehicle (V) in operation 310, the camera device 10 may transmit the rear view video to the digital rear mirror device 100 in operation 320, and accordingly, the digital rear mirror module 110 may display the rear view video in operation 330.

Meanwhile, in operation 340, the ETCS module 130 of the digital rear mirror device 100 may support automatic toll collection for the vehicle (V). That is, when the vehicle (V) passes through a toll road or bridge, the ETCS module 130 may perform payment for toll charged to the vehicle (V). In detail, the ETCS relay device 20 may detect the passing vehicle (V), the ETCS server 30 may transmit a payment request to the ETCS module 130 of the corresponding vehicle (V) through the ETCS relay device 20, and in response thereto, the ETCS module 130 may perform a payment to the ETCS server 30 through the ETCS relay device 20. In this process, the ETCS module 130 may receive information from the ETCS relay device 20. For example, the corresponding information may include at least one of billing information according to electronic toll collection, event information, traffic information, environmental information, and disaster situation information. In operation 350, the ETCS module 130 may transmit the corresponding information to the digital rear mirror module 110. Through this, in operation 340, the digital rear mirror module 110 may display the corresponding information while providing the rear view. Here, the digital rear mirror module 110 may display the corresponding information during a predetermined period of time.

As described above, when the digital rear mirror device 100 includes the digital rear mirror module 110 and the ETCS module 130 within the housing 200, the ETCS module 130 may transmit this information to the digital rear mirror module 110 and accordingly, the digital rear mirror module 110 may display the information while providing the rear view. However, the present disclosure is not limited thereto. The digital rear mirror device 100 may include only the digital rear mirror module 110 in the housing 200, and the ETCS module 130 may be present outside the digital rear mirror device 100. Even in this case, the ETCS module 130 may transmit the information to the digital rear mirror module 110 and accordingly, the digital rear mirror module 110 may display the corresponding information while providing the rear view.

Figure 4:
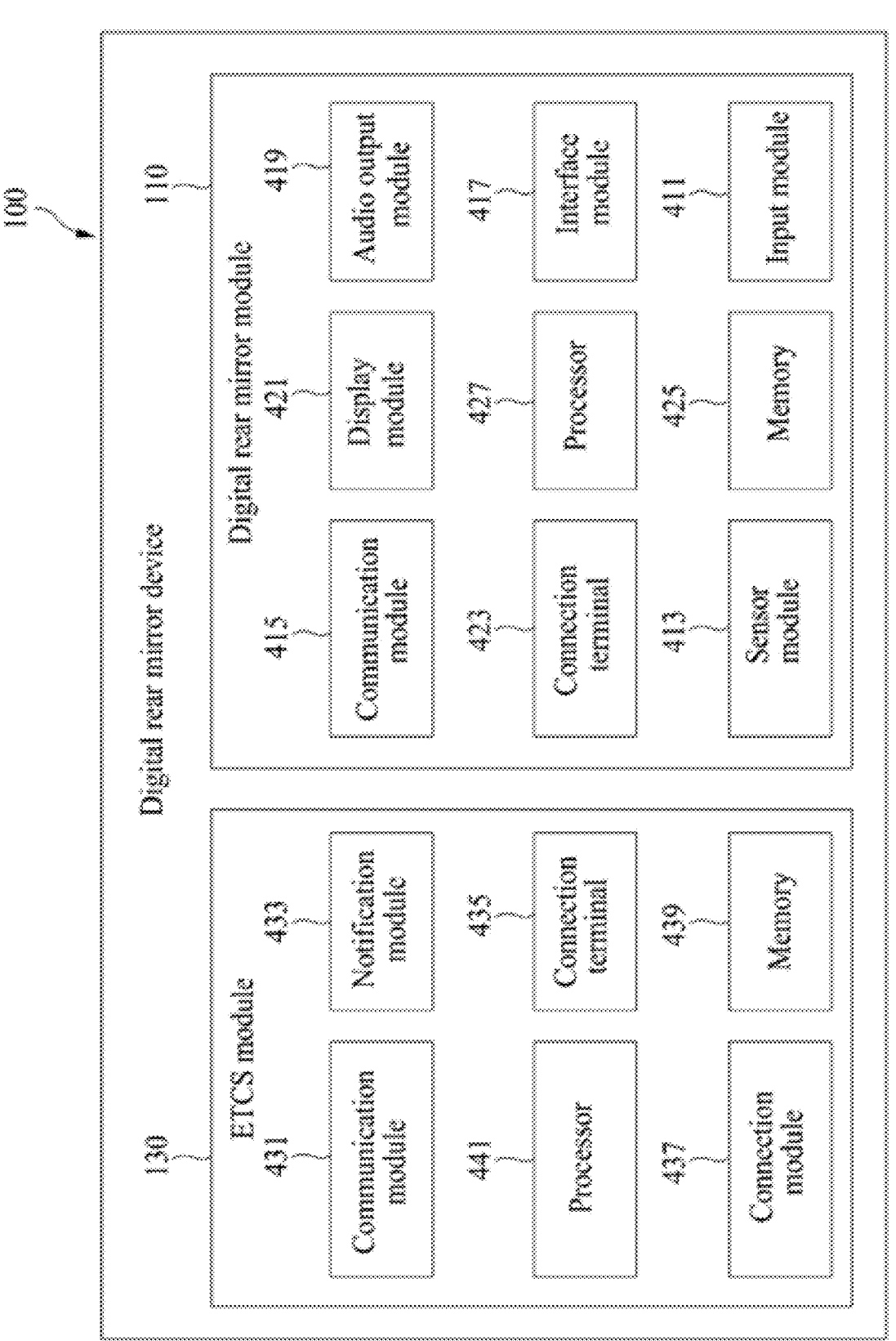
FIG. 4 is a diagram illustrating a configuration of a digital rear mirror device according to various example embodiments.
Figure 5:
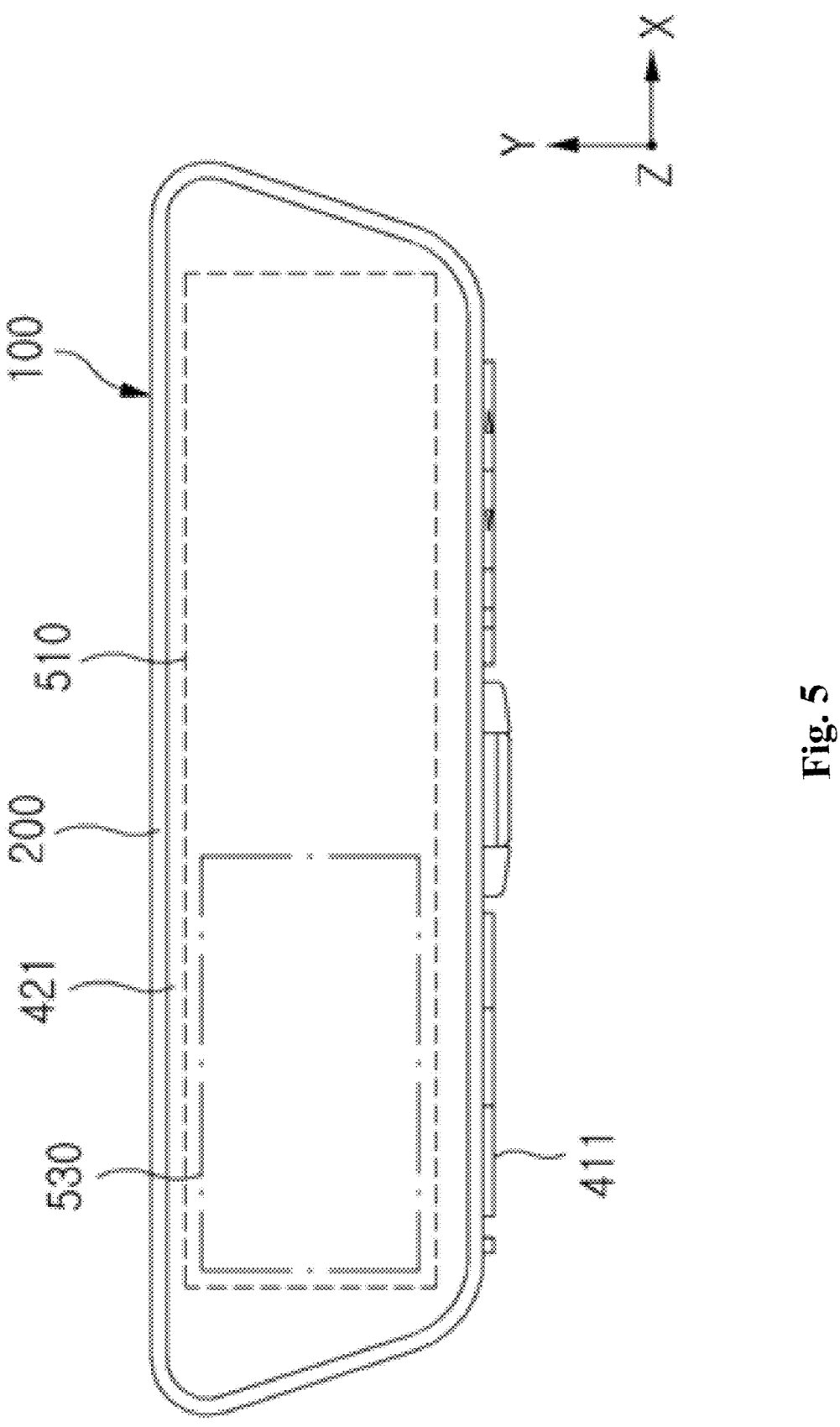
FIG. 5 illustrates an internal structure of a digital rear mirror device according to a first example embodiment.
Figure 6:
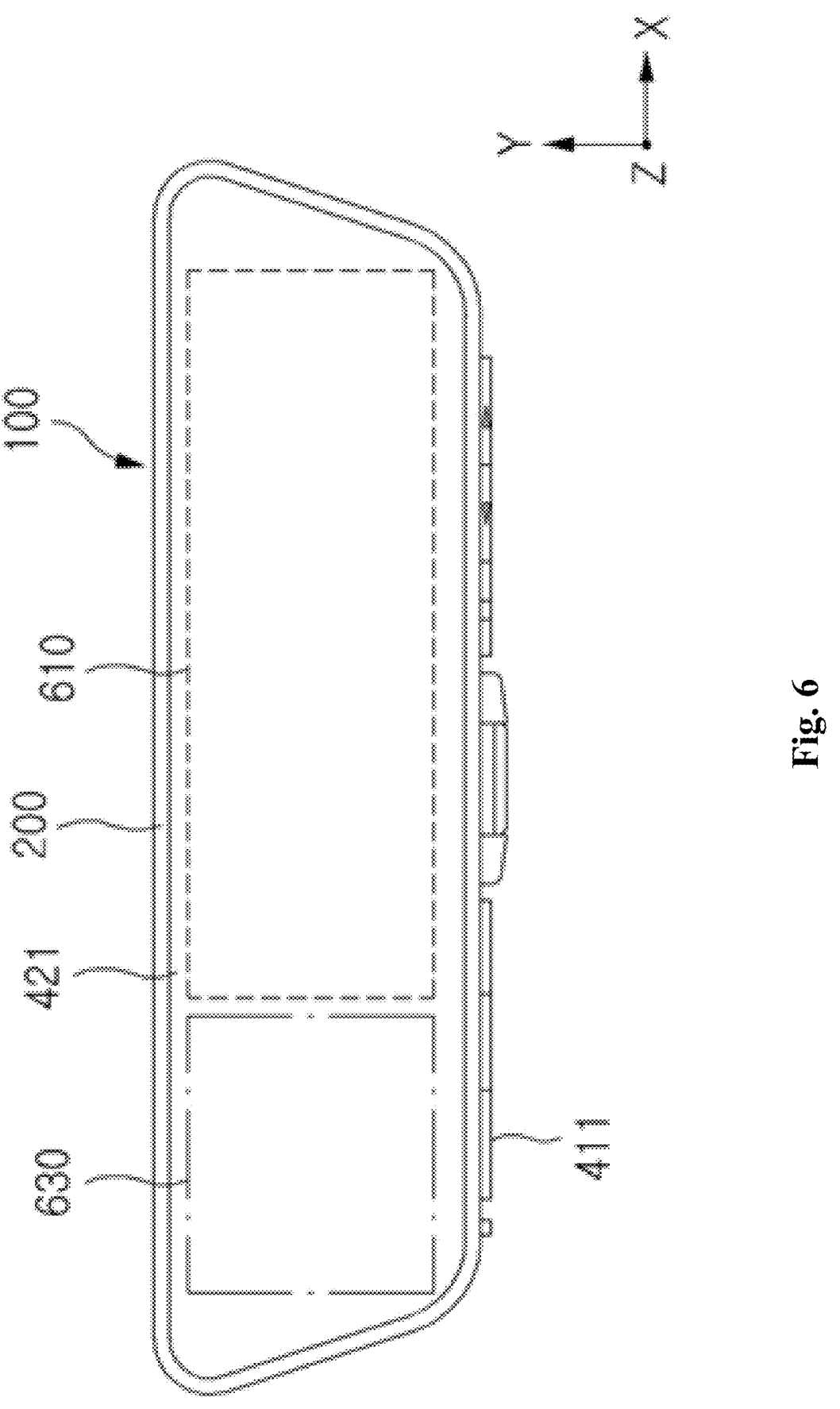
FIG. 6 illustrates an internal structure of a digital rear mirror device according to a second example embodiment.
Figure 7A:
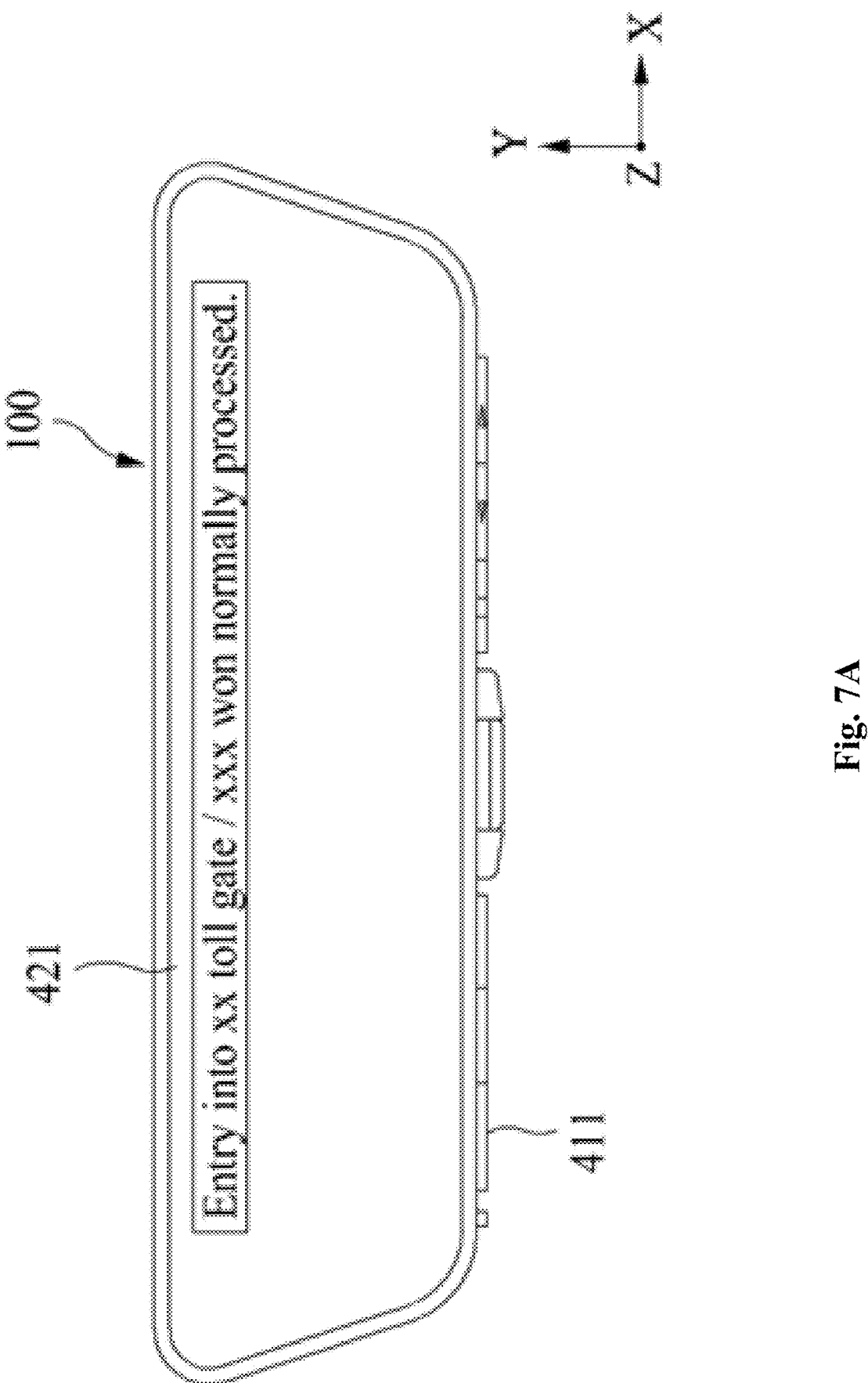
FIGS. 7A, 7B, and 7C illustrate a characteristic function of a digital rear mirror device according to various example embodiments.
Figure 7B:
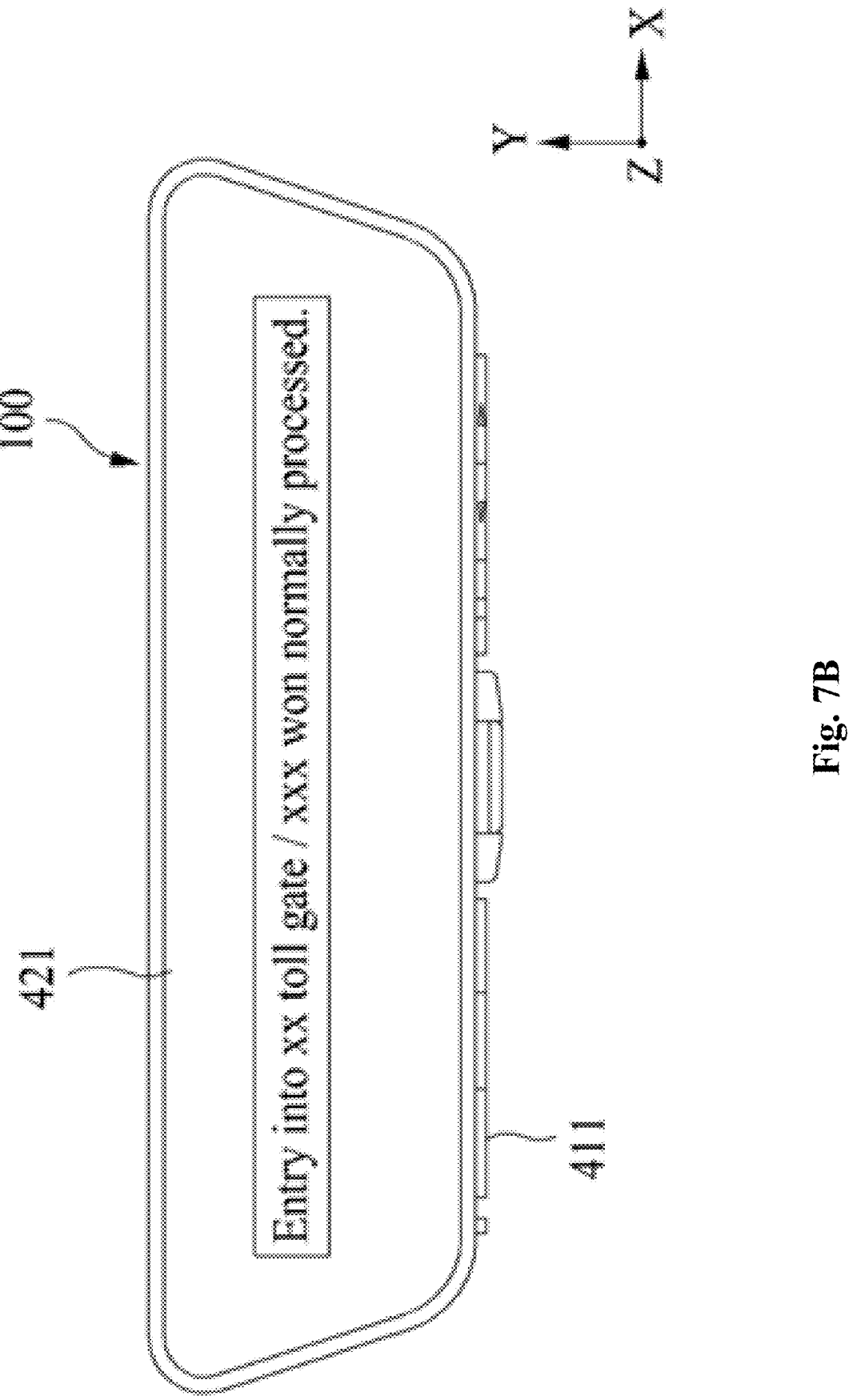
Figure 7C:
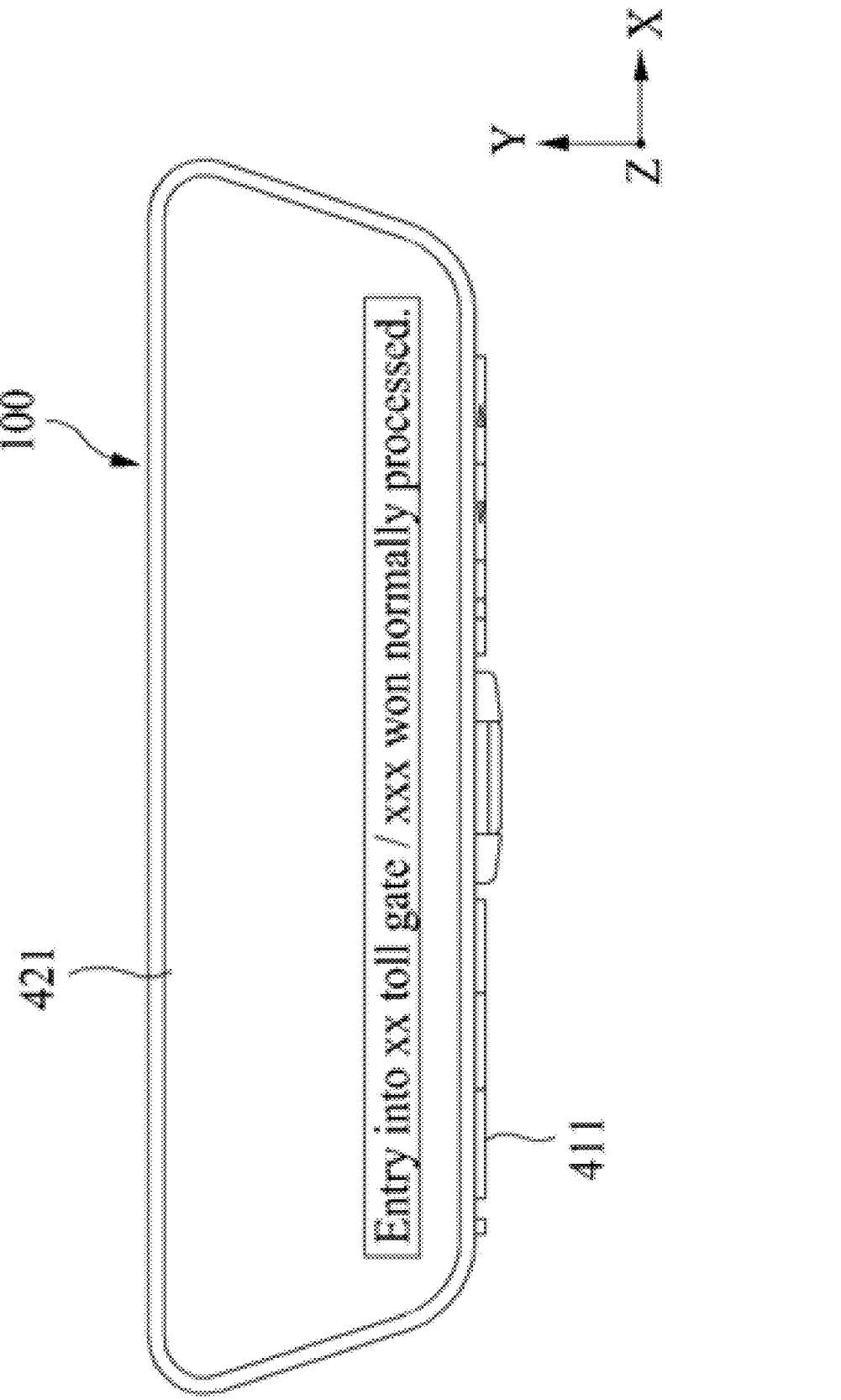

FIG. 4 is a diagram illustrating a configuration of the digital rear mirror device 100 according to various example embodiments. FIG. 5 illustrates an internal structure of the digital rear mirror device 100 according to a first example embodiment. FIG. 6 illustrates an internal structure of the digital rear mirror device 100 according to a second example embodiment. FIGS. 7A, 7B, and 7C illustrate a characteristic function of the digital rear mirror device 100 according to various example embodiments.

Referring to FIG. 4, the digital rear mirror device 100 may be mounted inside the vehicle (V) with the camera device 10 and may be communicatively connected to the camera device 10. Here, the digital rear mirror device 100 may be provided within the driver's field of view range. In detail, the digital rear mirror device 100 may include the digital rear mirror module 110 and the ETCS module 130. As shown in FIGS. 5 and 6, the digital rear mirror module 110 and the ETCS module 130 may be implemented as separate substrates (first substrates 510 and 610 and second substrates 530 and 630 of FIGS. 5 and 6), respectively, within a single housing 200.

The digital rear mirror module 110 may include the first substrate 510, 610 and a plurality of first components mounted on the first substrate 510, 610. The first components may include an input module 411, a sensor module 413, a communication module 415, an interface module 417, an audio output module 419, a display module 421, a connection terminal 423, a memory 425, and a processor 427. In various example embodiments, as shown in FIGS. 5 and 6, the first substrates 510 and 610 may be provided on at least a portion of the rear surface of the display module 421 within the housing 200. In some example embodiments, at least one of the first components may be omitted, and at least one another first component may be added. In some example embodiments, at least two of such first components may be implemented as a single integrated circuit.

The input module 411 may input a signal to be used for at least one first component. For example, the input module 411 may include at least one button (which may also be referred to as key), a keyboard, a keypad, a mouse, a joystick, and a microphone. The button may be arranged on at least one edge of the display module 421. For example, as shown in FIGS. 5, 6, 7A, 7B, and 7C, the button may be arranged on one edge of the display module 421 at a lower end of the digital rear mirror device 100. Here, the button may include at least one of a physical button ad a touch button. As illustrated, the physical button may have a pressable structure that protrudes from the surface of the housing 200. Although not illustrated, the touch button may have a flat structure relative to the surface of the housing 200. In some example embodiments, the input module 411 may include a touch circuitry configured to be assembled with the display module 421.

The sensor module 413 may generate an electrical signal or a data value corresponding to an internal operation state (e.g., power or temperature) of the digital rear mirror device 100 or an external environmental state. For example, the sensor module 413 may include at least one of a global positioning system (PGS) sensor, a motion sensor (which may also be referred to as a gesture sensor), a proximity sensor, a touch sensor, a radar sensor, a light detection and ranging (LIDAR) sensor, a movement sensor, a gyro sensor, a barometric pressure sensor, a magnetic sensor, an acceleration sensor (e.g., G sensor), a proximity sensor, an infrared (IR) sensor, a biosignal sensor, a temperature sensor, a humidity sensor, and an illuminance sensor.

The communication module 415 may communicate with an external device. The communication module 415 may establish a communication channel between the digital rear mirror module 110 and the external device and may communicate with the external device through the communication channel. Here, the external device may include at least one of a satellite, a base station, a server, and an electronic device (e.g., used by user). The communication module 415 may include at least one of a wired communication module and a wireless communication module. The wired communication module may be connected to the external device in a wired manner and may communicate with the external device in the wired manner. The wireless communication module may include at least one of a near field communication module and a far field communication module. The near field communication module may communicate with the external device using a near field communication scheme. For example, the near field communication scheme may include at least one of Bluetooth, wireless fidelity (WiFi) direct, near field communication (NFC), and infrared data association (IrDA). The far field communication module may communicate with the external device using a far field communication scheme. Here, the far field communication module may communicate with the external device over a network. For example, the network may include at least one of a cellular network, the Internet, and a computer network such as a local area network (LAN) and a wide area network (WAN).

According to various example embodiments, at least one of the input module 411, the sensor module 413, and the communication module 415 may generate a user input. In an example embodiment, the input module 411 or an arbitrary sensor of the sensor module 413 may generate the user input based on a signal that is directly input from the user. In another example embodiment, the communication module 415 may generate the user input based on a signal that is input from the electronic device used by the user.

The interface module 417 may be provided for connection to the external device. In detail, the interface module 417 may support a designated protocol connectable to the external device in a wired or wireless manner. Here, the external device may include at least one of the vehicle (V) and the camera device 10. In an example embodiment, when the camera device 10 performs communication using an analog method, the interface module 417 may receive video information from the camera device 10 and may convert the same from an analog signal to digital data. In another example embodiment, when the camera device 10 performs communication using a digital method, the interface module 417 may receive video information from the camera device 10 and may convert the same from serial data to parallel data. In this case, the interface module 417 may be implemented as a deserializer.

The audio output module 419 may output an audio signal generated from the digital rear mirror module 110. For example, the audio output module 419 may include at least one of a speaker and a receiver. In an example embodiment, the audio output module 419 may include, within the speaker, at least one voice coil that provides vibration to a diaphragm and a magnet capable of forming a magnetic field. When current flows in the voice coil, the magnetic field formed in the voice coil may vibrate the voice coil through interaction with the magnetic field formed by the magnet. The diaphragm connected to the voice coil may vibrate based on vibration of the voice coil. The speaker may output the audio signal based on the vibration of the diaphragm.

The display module 421 may be configured to provide rear view of a vehicle (V). The display module 421 may output visualized information for the driver. For example, the display module 421 may include at least one of a display, a hologram device, and a projector. In some example embodiments, the display module 421 may be implemented as a touchscreen by being assembled with a touch circuitry of the input module 411. The display module 421 may display video information received from the processor 427. As shown in FIGS. 5, 6, 7A, 7B, and 7C, the display module 421 may be accommodated within the housing 200 such that a display area may be exposed toward the rear of the vehicle (V). In various example embodiments, the display module 421 may operate in at least one of a mirror mode and a display mode. In the mirror mode, the display module 421 may directly illuminate the rear view of the vehicle (V) using reflection of light. In the display mode, the display module 421 may provide the rear view of the vehicle (V) by displaying a rear view video received from the processor 427. In various example embodiments, the display module 421 may have an anti-glare function that is activated according to an applied voltage. To this end, the display module 421 may be implemented using, for example, an electronic chromic (EC) method or a liquid crystal (LC) method.

The connection terminal 423 may be provided for connection to the ETCS module 130. In detail, the connection terminal 423 may be connected to a connection terminal 435 of the ETCS module 130. For example, the connection terminal 423 may be implemented as a universal asynchronous receiver/transmitter (UART).

The memory 425 may store a variety of data used by at least one first component. For example, the memory 425 may include at least one of a volatile memory and a non-volatile memory. Data may include at least one program and input data or output data related thereto. The program may be stored in the memory 425 as software including at least one instruction, and for example, may include at least one of an operating system (OS), middleware, and an application.

The processor 427 may control at least one first component by executing the program of the memory 425. Through this, the processor 427 may perform data processing or arithmetic operations. Here, the processor 427 may execute an instruction stored in the memory 425.

In various example embodiments, the processor 427 may provide the rear view of the vehicle (V) through the display module 421. The processor 427 may operate in at least one of the mirror mode and the display mode using the display module 421. In the mirror mode, the processor 427 may directly illuminate the rear view of the vehicle (V) through the display module 421. In the display mode, the processor 427 may provide the rear view of the vehicle (V) by acquiring the rear view video of the vehicle (V) from the camera device 10 through the interface module 417 and by displaying the rear view video through the display module 421. Here, when operable in both the mirror mode and the display mode, the processor 427 may switch between the mirror mode and the display mode if necessary. In some example embodiments, the processor 427 may switch between the mirror mode and the display mode in response to a user input.

In various example embodiments, the processor 427 may display information through at least a portion of the display module 421 while providing the rear view through the display module 421. Here, the processor 427 may display the information in an on screen display (OSD) manner to be overlappingly displayed in the rear view. For example, the processor 427 may include a video scaler, and may transmit the information to the video scaler through an inter-integrated circuit (I2C) interface, such that the video scaler may display the information in the OSC manner through the display module 421. In some example embodiments, the information may be based on at least one of information received from the outside and information stored in advance. For example, the processor 427 may display the information in response to an external signal. Here, the external signal may represent a signal that is received through at least one of the communication module 415, the interface module 417, and the connection terminal 423. As another example, the processor 427 may display the information in response to a user input. In other example embodiments, the information may include reference information related to the rear view. In detail, the processor 427 may detect the reference information by analyzing the rear view. The reference information may be information in the rear view, for example, a road sign and may be information derived from the rear view, for example, a distance from an adjacent vehicle and a speed of the adjacent vehicle.

In some example embodiments, the processor 427 may further provide a front view of the vehicle (V) through the display module 421. The camera device 10 may transmit a front view video to the digital rear mirror device 100 and accordingly, the processor 427 may display the front view video through the display module 421. In this case, the processor 427 may acquire information on the front of the vehicle (V) from the front view video. For example, when electronic toll collection for the vehicle (V) is required, the processor 427 may detect a lane in which electronic toll collection is possible through the acquired front view video and accordingly, allows the vehicle (V) to change its lane in advance to the lane in which electronic toll collection is possible.

In various example embodiments, the processor 427 may additionally adjust the display module 421. In some example embodiments, the processor 427 may activate an anti-glare function of the display module 421 by adjusting a voltage applied to the display module 421. In response to a user input or a sensing input that is input through the sensor module 413, the processor 427 may adjust the display module 421. For example, the processor 427 may detect the sensing input indicating ambient brightness that is input through an illuminance sensor and, in response thereto, may activate the anti-glare function of the display module 421.

The ETCS module 130 may include the second substrate 530, 630 and a plurality of second components mounted on the second substrate 530, 630. The second components may include a communication module 431, a notification module 433, a connection terminal 435, a connection module 437, a memory 439, and a processor 441. In the first example embodiment, as shown in FIG. 5, the second substrate 530 may be stacked and arranged on the first substrate 510 within the housing 200 and on the back of the display module 421. In the second example embodiment, as shown in FIG. 6, the second substrate 630 may be arranged separate from the first substrate 610, rather than being stacked on the first substrate 610, within the housing 200 and on the back of the display module 421. In other words, when the first substrate 610 is provided on a portion of the back of the display module 421, the second substrate 630 may be provided on a remaining portion of the back of the display module 421. In some example embodiments, at least one (e.g., connection module 437) of the second components may be omitted and at least one another second component may be added. In some example embodiments, at least two of the second components may be implemented as a single integrated circuit.

The communication module 431 may perform communication with the external device. The communication module 431 may establish a communication channel between the ETCS module 130 and the external device, and may perform communication with the external device through the communication channel. Here, the external device may include the ETCS relay device 20. The communication module 431 may communicate with the ETCS relay device 20 using a wireless communication method. For example, the wireless communication method may include at least one of a radio frequency method and an infrared ray method. In the case of the radio frequency method, V-line propagation may be used.

The notification module 433 may output a notification signal generated from the ETCS module 130. The notification signal may include at least one of an audio signal and a light emitting signal. The notification module 433 may include at least one of an audio output module that outputs an audio signal, for example, a speaker or a receiver. Meanwhile, the notification module 433 may include a light emitting module that outputs a light emitting signal, for example, a light emitting diode (LED) lamp. The notification module 433 may be exposed at various locations of the digital rear mirror device 100. For example, the notification module 433 may be exposed on the lower surface of the digital rear mirror device 100.

The connection terminal 435 may be provided for connection to the digital rear mirror module 110. In detail, the connection terminal 435 may be connected to the connection terminal 423 of the digital rear mirror module 110. For example, the connection terminal 435 may be implemented as a UART.

The connection module 437 may be provided for connection to a physical card. The physical card may have card information used for electronic toll collection. The physical card may insert into the digital rear mirror device 100. When inserted into the digital rear mirror device 100, the physical card may be connected to the connection module 437. To this end, although not illustrated, the physical card may insert into the housing 200. A structure that connects the inserted physical card to the connection module 437, for example, a socket may be provided.

The memory 439 may include a variety of data used by at least one second component. For example, the memory 439 may include at least one of a volatile memory and a non-volatile memory. Data may include at least one program and input data or output data related thereto. The program may be stored in the memory 439 as software that includes at least one instruction, and for example, may include at least one of an operating system (OS), middleware, and an application. In some example embodiments, the memory 439 may store a virtual card having card information used for electronic toll collection.

The processor 441 may control at least one second component by executing the program of the memory 439. Through this, the processor 441 may perform data processing or arithmetic operations. Here, the processor 441 may execute an instruction stored in the memory 439.

In various example embodiments, the processor 441 may support electronic toll collection for the vehicle (V). That is, when the vehicle (V) passes through a toll road or bridge, the processor 441 may perform payment for toll collected for the vehicle (V) using cad information of the physical card or card information of the virtual card. In detail, the processor 441 may receive a payment request from the ETCS relay device 20 through the communication module 431 and, in response thereto, the processor 441 may perform payment to the ETCS server 30 via the ETCS relay device 20 using card information through the communication module 431. Here, the processor 441 may verify card information of the physical card through the connection module 437, or may verify card information of the virtual card stored in the memory 439.

In various example embodiments, the processor 441 may transmit information received from the ETCS relay device 20 to the digital rear mirror module 110. For example, the corresponding information may include at least one of billing information according to electronic toll collection, event information, traffic information, environmental information, and disaster situation information. Accordingly, the processor 441 may display the information while the digital rear mirror module 110 provides the rear view.

As such, as shown in FIG. 5 or 6, the digital rear mirror module 110 and the ETCS module 130 may be implemented as separate substrates 510 and 530, 610 and 630, respectively, within the housing 200. In detail, the digital rear mirror module 110 may be implemented as the first substrate 510, 610, and the ETCS module 130 may be implemented as the second substrate 530, 630. The first substrate 510, 610 and the second substrate 530, 630 may be provided within the housing 200 and on the back of the display module 421, respectively.

In the first example embodiment, as shown in FIG. 5, the first substrate 510 and the second substrate 530 may be stacked and arranged within the housing 200 and on the back of the display module 421. In this case, in a direction perpendicular to the display module 421 (e.g., Z-direction in FIGS. 5 and 6), a thickness of the digital rear mirror device 100 may be determined by including both a thickness of the digital rear mirror module 110 and a thickness of the ETCS module 130. Therefore, the thickness of the digital rear mirror device 100 may be relatively thick, which may require a wide space occupied by the digital rear mirror device 100 within the vehicle (V) and may degrade the space utilization of the vehicle (V) and the flexibility for the design of the digital rear mirror device 100. In addition, as the first substrate 510 and the second substrate 530 are stacked, heating of the first substrate 510 and the second substrate 530 may cause thermal accumulation and the digital rear mirror device 100 may be overheated, which may lead to malfunction or breakdown of the digital rear mirror device 100.

In the second example embodiment, as shown in FIG. 6, the first substrate 610 and the second substrate 630 may be separated from each other and arranged, rather than being stacked, within the housing 200 and on the back of the display module 421. In other words, when the first substrate 610 is provided on a portion of the back of the display module 421, the second substrate 630 may be provided on a remaining portion of the back of the display module 421. For example, the first substrate 610 and the second substrate 630 may be arranged in a straight-line arrangement manner on the same plane. In this case, in the direction perpendicular to the display module 421 (e.g., Z-direction in FIGS. 5 and 6), the thickness of the digital rear mirror device 100 may be determined based on a thicker one between the thickness of the digital rear mirror module 110 and the thickness of the ETCS module 130. Therefore, the thickness of the digital rear mirror device 100 may be reduced, which may reduce a space occupied by the digital rear mirror device 100 within the vehicle (V) and may improve the space utilization of the vehicle (V) and the flexibility for the design of the digital rear mirror device 100. In addition, as the first substrate 610 and the second substrate 630 are separately arranged, heating of the first substrate 610 and the second substrate 630 may be distributed over a large area and may also be discharged by surrounding air flow (e.g., natural convection and forced convection using fan), which may prevent overheating of the digital rear mirror device 100. In addition, since separate dissipation solutions (e.g., shield cans or thermally conductive materials) may be applied to the first substrate 610 and the second substrate 630, respectively, heat generation of the first substrate 610 and the second substrate 630 may be more effectively resolved, further preventing overheating of the digital rear mirror device 100.

Meanwhile, the digital rear mirror module 110 may display information received through the ETCS module 130, while providing the rear view of the vehicle (V). In detail, the ETCS module 130 may transmit information received from the ETCS relay device 20 to the digital rear mirror module 110. Through this, as shown in FIG. 7A, 7B, or 7C, the digital rear mirror module 110 may display the information while providing the rear view through the display module 421. In some example embodiments, the digital rear mirror module 110 may select and display corresponding information since it is preset based on the user input. That is, the digital rear mirror module 110 may display the information on at least one of top, center, and bottom of the display module 421 in an OSD manner to be overlappingly displayed in the rear view. For example, the information may include at least one of billing information according to electronic toll collection, event information, traffic information, environmental information, and disaster situation information. The billing information may include information on a location (e.g., toll gate name) of the ETCS relay device 20 and toll.

As described above, when the digital rear mirror device 100 includes the digital rear mirror module 110 and the ETCS module 130 within the housing 200, the ETCS module 130 may transmit the information to the digital rear mirror module 110 and accordingly, the digital rear mirror module 110 may display the information while providing the rear view. However, the present disclosure is not limited thereto. The digital rear mirror device 100 may include only the digital rear mirror module 110 within the housing 200, and the ETCS module 130 may be outside the digital rear mirror device 100. Even in this case, the ETCS module 130 may transmit the information to the digital rear mirror module 110 and accordingly, the digital rear mirror module 110 may display the information while providing the rear view through the display module 421 as shown in FIG. 7A, 7B, or 7C.

Figure 8:
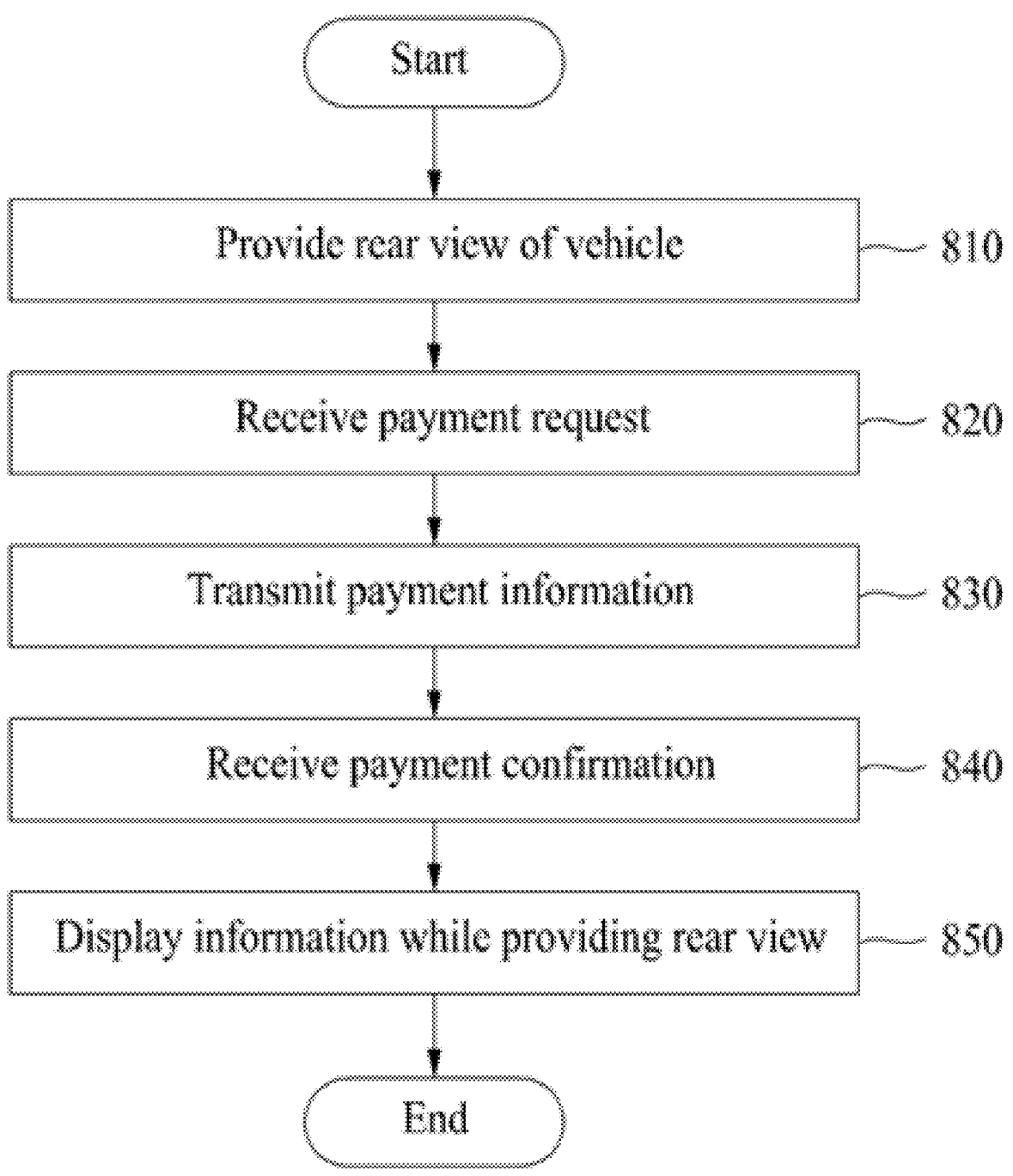
FIG. 8 is a flowchart illustrating an operating method of a digital rear mirror device according to various example embodiments.

FIG. 8 is a flowchart illustrating an operating method of the digital rear mirror device 100 according to various example embodiments. Here, the operating method may be applied to not only a case in which the digital rear mirror device 100 includes the digital rear mirror module 110 and the ETCS module 130 within the housing 200, but also a case in which the digital rear mirror device 100 includes only the digital rear mirror module 110 within the housing 200 and the ETCS module 130 is outside the digital rear mirror device 100.

Referring to FIG. 8, in operation 810, the digital rear mirror module 110 may provide a rear view of the vehicle (V). In detail, the processor 427 may provide the rear view of the vehicle (V) through the display module 421. Here, the processor 427 may operate in at least one of a mirror mode and a display mode using the display module 421. In the mirror mode, the processor 427 may directly illuminate the rear view of the vehicle (V) through the display module 421. In the display mode, the processor 427 may provide the rear view of the vehicle (V) by acquiring the rear view video of the vehicle (V) from the camera device 10 through the interface module 417 and by displaying the rear view video through the display module 421. Here, when operable in both the mirror mode and the display mode, the processor 427 may switch between the mirror mode and the display mode if necessary. In some example embodiments, the processor 427 may switch between the mirror mode and the display mode in response to a user input.

While the digital rear mirror module 110 provides the rear view of the vehicle (V), the ETCS module 130 may support automatic toll collection for the vehicle (V) in operations 820, 830, and 840. That is, when the vehicle (V) passes through a toll road or bridge, the ETCS module 130 may perform payment for toll collected for the vehicle (V).

Initially, in operation 820, the ETCS module 130 may receive a payment request. In detail, when the vehicle (V) passes through a location at which the ETCS relay device 20 is installed in the toll road or bridge, the ETCS relay device 20 may detect the passing vehicle (V) and the ETCS server 30 may transmit the payment request to the ETCS module 130 through the ETCS relay device 20. As a result, the processor 441 may receive the payment request through the communication module 431.

In response thereto, in operation 830, the ETCS module 130 may perform payment. In detail, the processor 441 may perform payment to the ETCS server 30 via the ETCS relay device 20 using card information through the communication module 431. In an example embodiment, when a physical card is inserted into the digital rear mirror device 100 and connected to the connection module 437, the processor 441 may verify card information of the physical card through the connection module 437. In another example embodiment, when a virtual card is stored in the memory 439, the processor 441 may verify card information of the virtual card from the memory 439.

Then, in operation 840, the ETCS module 130 may receive payment confirmation. In detail, according to a payment performance result of the ETCS module 130, the ETCS server 30 may transmit the payment confirmation to the ETCS module 130 through the ETCS relay device 20. Here, the payment confirmation may represent payment success or payment failure. As a result, the processor 441 may receive the payment confirmation through the communication module 431.

Then, while the digital rear mirror module 110 provides the rear view of the vehicle (V), the digital rear mirror module 110 may display information received from the ETCS module 130 in operation 850. In detail, the ETCS module 130 may transmit information received from the ETCS relay device 20 to the digital rear mirror module 110. Here, since the connection terminal 423 of the digital rear mirror module 110 and the connection terminal 435 of the ETCS module 130 are connected, the processor 441 may transmit the corresponding information through the connection terminal 435 and the processor 427 may receive the information through the connection terminal 423. Here, the information may be received from the ETCS relay device 20 through at least one of the payment request and the payment confirmation, or may be received from the ETCS relay device 20 separate from the payment request and the payment information. For example, the information may include at least one of billing information according to electronic toll collection, event information, traffic information, environmental information, and disaster situation information. Accordingly, the processor 427 may display the corresponding information through at least a portion of the display module 421 while providing the rear view through the display module 421. The processor 427 may display the information in at least one of top, center, and bottom of the display module 421 in an OSD manner to be overlappingly displayed in the rear view. Here, the processor 427 allows the information to be displayed during a predetermined period of time.

In some example embodiments, when the ETCS module 130 transmits the information to the digital rear mirror module 110, the ETCS module 130 may output a notification signal for the information. In detail, the processor 441 may output at least one of an audio signal and a light emitting signal through the notification module 433. Here, the audio signal may include at least one of a preset notification sound and voice reading the information (e.g., text-to-voice conversion). In other example embodiments, when the digital rear mirror module 110 displays the information, the digital rear mirror module 110 may output an audio signal for the information. In detail, the processor 427 may output the audio signal for the information through the audio output module 419. Here, the audio signal may include at least one of a preset notification sound and voice reading the information (e.g., text-to-voice conversion).

According to the present disclosure, the digital rear mirror device 100 may provide the rear view of the vehicle (V) and may also support electronic toll collection. Therefore, the digital rear mirror device 100 may be mounted to the vehicle (V) to perform smooth communication with the ETCS relay device 20 and to not spoil the aesthetics of the vehicle (V). Here, the digital rear mirror device 100 may include the ETCS module 130 with the digital rear mirror module 110 within a single housing 200, and the substrates 610 and 630 that implement the digital rear mirror module 110 and the ETCS module 130, respectively, may be separated from each other and arranged within the housing. Therefore, a thickness of the digital rear mirror device 100 may be reduced, which may reduce a space occupied by the digital rear mirror device 100 within the vehicle (V), thereby improving space utilization of the vehicle (V) and flexibility for the design of the digital rear mirror device 100. In addition, overheating of the digital rear mirror device 100 may be prevented.

According to the present disclosure, the digital rear mirror device 100 may display information received through the ETCS module 130 while providing the rear view of the vehicle (V). Through this, the digital rear mirror device 100 allows the driver to intuitively grasp the information while looking ahead during driving.

In short, provided are the ETCS-supporting integrated digital rear mirror device 100 and an operating method thereof.

In the present disclosure, the digital rear mirror device 100 of the vehicle (V) may include the digital rear mirror module 110 configured to provide a rear view of the vehicle (V) and the ETCS module 130 arranged separate from the digital rear mirror module 110 within the digital rear mirror device 100 and configured for electronic toll collection for the vehicle (V).

According to various example embodiments, the digital rear mirror module 110 may include the first substrate 610 and a plurality of first components mounted on the first substrate 610, the first components may include the display module 421 provided toward the rear of the vehicle (V), and the first substrate 610 may be provided on a portion of the back of the display module 421.

According to various example embodiments, the ETCS module 130 may include the second substrate 630 and a plurality of second components mounted on the second substrate 630, and the second substrate 630 may be provided on a remaining portion of the back of the display module 421.

According to various example embodiments, the ETCS module 130 may be configured to transmit information received from an external device to the digital rear mirror module 110, and the digital rear mirror module 110 may be configured to display the information while providing the rear view through the display module 421.

According to various example embodiments, the information may include at least one of billing information, event information, traffic information, environmental information, and disaster situation information.

According to various example embodiments, the external device may include the ETCS relay device 20 that is installed at a predetermined location, capable of communicating with the ETCS module 130 as the vehicle (V) passes through the location, and connected to the ETCS server 30 for executing the electronic toll collection for the vehicle (V).

According to various example embodiments, the digital rear mirror module 110 may be configured to connect to at least one camera device 10 mounted to the vehicle (V) and to provide the rear view by displaying a rear view video of the vehicle (V) captured by the camera device 10 through the display module 421.

According to various example embodiments, the digital rear mirror module 110 may be configured to switch between a mirror mode for directly illuminating the rear view through the display module 421 and a display mode for providing the rear view by displaying the rear view video.

According to various example embodiments, the second components may include the memory 439 that stores a virtual card having card information used for the electronic toll collection.

According to various example embodiments, the second components may include at least one connection module 437 configured to connect to a physical card that has card information used for the electronic toll collection and inserts into the digital rear mirror device 100.

In the present disclosure, the digital rear mirror device 100 of the vehicle (V) may include the display module 421, and the processor 427 configured to connect to the display module 421 and to display information received through the ETCS module 130 configured for electronic toll collection for the vehicle (V), while providing a rear view of the vehicle (V) through the display module 421.

According to various example embodiments, the digital rear mirror device 100 may further include the first substrate 610 provided on a portion of the back of the display module 421 and on which the display module 421 and the processor 427 are installed, and the second substrate 630 provided on a remaining portion of the back of the display module 421 and on which the ETCS module 130 is implemented.

According to various example embodiments, the ETCS module 130 may be configured to receive information from an external device.

According to various example embodiments, the information may include at least one of billing information, event information, traffic information, environmental information, and disaster situation information.

According to various example embodiments, the external device may include the ETCS relay device 20 that is installed at a predetermined location, capable of communicating with the ETCS module 130 as the vehicle (V) passes through the location, and connected to the ETCS server 30 for executing electronic toll collection for the vehicle (V).

In the present disclosure, an operating method of the digital rear mirror device 100 of the vehicle (V) may include providing, by the digital rear mirror module 110, a rear view of the vehicle (V) (operation 810), and supporting, by the ETCS module 130 arranged separate from the digital rear mirror module 110 within the digital rear mirror device 100, electronic toll collection for the vehicle (V) (operations 820, 830, and 840).

According to various example embodiments, the digital rear mirror module 110 may include the first substrate 610 and a plurality of first components mounted on the first substrate 610, the first components may include the display module 421 provided toward the rear of the vehicle (V), and the first substrate 610 may be provided on a portion of the back of the display module 421.

According to various example embodiments, the ETCS module 130 may include the second substrate 630 and a plurality of second components mounted on the second substrate 630, and the second substrate 630 may be provided on a remaining portion of the back of the display module 421.

According to various example embodiments, the operating method of the digital rear mirror device 100 may further include transmitting, by the ETCS module 130, information received from the external device to the digital rear mirror module 110, and displaying, by the digital rear mirror module 110, information while providing the rear view through the display module 421 (operation 850).

According to various example embodiments, the information may include at least one of billing information, event information, traffic information, environmental information, and disaster situation information.

According to various example embodiments, the external device may include the ETCS relay device 20 that is installed at a predetermined location and connected to the ETCS server 30 for executing the electronic toll collection for the vehicle (V), the supporting the electronic toll collection (operations 820, 830, and 840) may include performing, by the ETCS module 130, payment for the electronic toll collection executed by the ETCS server 30 through communication with the ETCS relay device 20, when the vehicle (V) passes through the location.

According to various example embodiments, the digital rear mirror module 110 may be connected to at least one camera device 10 mounted to the vehicle (V), and the providing the rear view (operation 810) may include providing, by the digital rear mirror module 110, the rear view by displaying a rear view video of the vehicle (V) captured by the camera device 10 through the display module 421 in a display mode.

According to various example embodiments, the providing the rear view (operation 810) may further include directly illuminating, by the digital rear mirror module 110, the rear view through the display module 421 in a mirror mode, and switching, by the digital rear mirror module 110, between the display mode and the mirror mode.

According to various example embodiments, the second components may include the memory 439 that stores a virtual card having card information used for the electronic toll collection.

According to various example embodiments, the second components may include at least one connection module 437 configured to connect to a physical card that has card information used for the electronic toll collection and inserts into the digital rear mirror device.

In the present disclosure, an operating method of the digital rear mirror device 100 of the vehicle (V) may include providing a rear view of the vehicle (V) through the display module 421 (operation 810), and displaying information received through the ETCS module 130 configured for electronic toll collection for the vehicle (V) while providing the rear view through the display module 421 (operation 850).

According to various example embodiments, the digital rear mirror device 100 may include the first substrate 610 provided on a portion of the back of the display module 421 and on which the display module 421 is installed, and the second substrate 630 provided on a remaining portion of the back of the display module 421 and on which the ETCS module 130 is implemented.

According to various example embodiments, the displaying the information may include receiving the information from the ETCS module 130 as the ETCS module 130 receives the information from an external device, and displaying the information through the display module 421.

According to various example embodiments, the information may include at least one of billing information, event information, traffic information, environmental information, and disaster situation information.

According to various example embodiments, the external device may include the ETCS relay device 20 that is installed at a predetermined location, capable of communicating with the ETCS module 130 as the vehicle (V) passes through the location, and connected to the ETCS server 30 for executing electronic toll collection for the vehicle (V).

Figure 9:
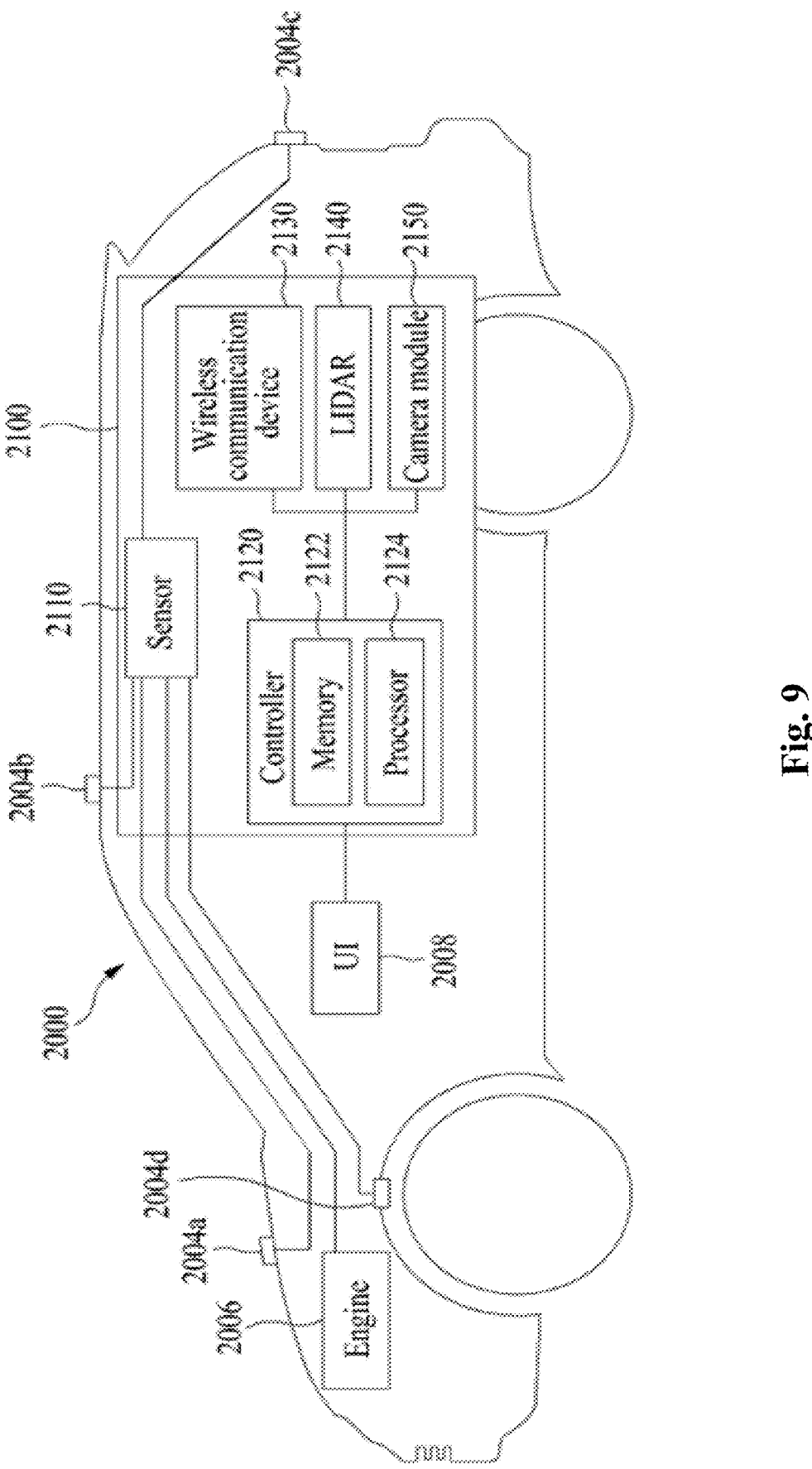
FIG. 9 is a block diagram illustrating a vehicle to which a digital rear mirror device is mounted according to various example embodiments is mounted.
Figure 10:
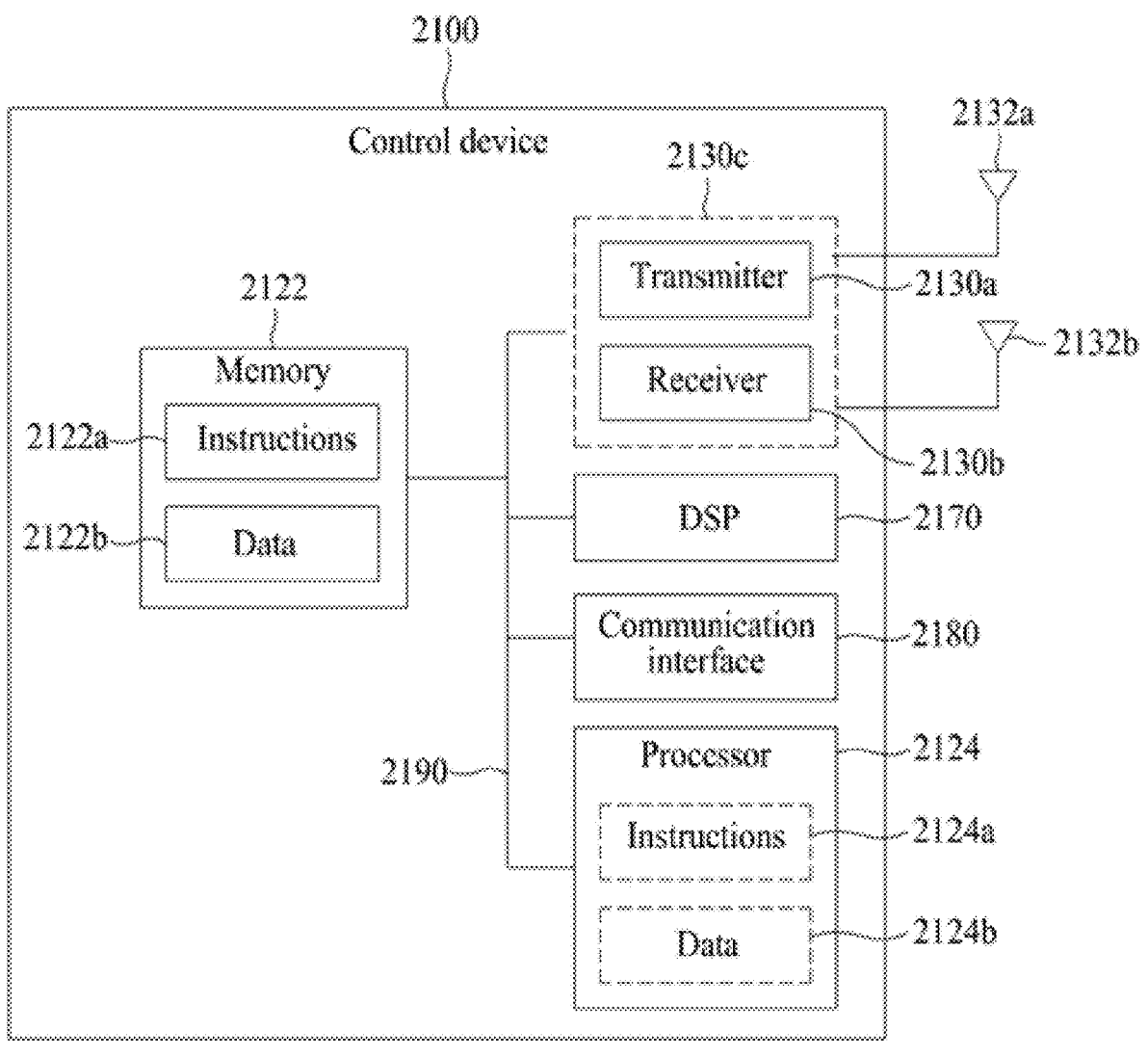
FIG. 10 is a block diagram illustrating a control device of the vehicle of FIG. 9.

FIG. 9 is a block diagram illustrating a vehicle 2000 to which the digital rear mirror device 100 is mounted according to various example embodiments. FIG. 10 is a block diagram illustrating a control device 2100 of the vehicle of FIG. 9.

Referring to FIGS. 9 and 10, the digital rear mirror device 100 according to various example embodiments may be mounted to the vehicle 2000 and the vehicle 2000 may include the control device 2100. Here, the vehicle 2000 may be an autonomous vehicle. In some example embodiments, at least one component of the digital rear mirror device 100 may be integrated into at least one component of the control device 2100.

The control device 2100 may include a controller 2120 that includes a memory 2122 and a processor 2124, a sensor 2110, a wireless communication device 2130, a light detection and ranging (LIDAR) device 2140, and a camera module 2150.

The controller 2120 may be configured at a time of manufacture by a manufacturing company of the vehicle or may be additionally configured to perform an autonomous driving function after manufacture. Alternatively, a configuration to continuously perform an additional function by upgrading the controller 2120 configured at the time of manufacture may be included.

The controller 2120 may forward a control signal to the sensor 2110, an engine 2006, a user interface (UI) 2008, the wireless communication device 2130, the LIDAR device 2140, and the camera module 2150 included as other components in the vehicle. Also, although not illustrated, the controller 2120 may forward a control signal to an acceleration device, a braking system, a steering device, or a navigation device associated with driving of the vehicle.

The controller 2120 may control the engine 2006. For example, the controller 2120 may sense a speed limit of a road on which the vehicle 2000 is driving and may control the engine 2006 such that a driving speed may not exceed the speed limit, or may control the engine 2006 to increase the driving speed of the vehicle 2000 within the range of not exceeding the speed limit. Additionally, when sensing modules 2004a, 2004b, 2004c, and 2004d sense an external environment of the vehicle and forward the same to the sensor 2110, the controller 2120 may receive external environment information, may generate a signal for controlling the engine 2006 or a steering device (not shown), and thereby control driving of the vehicle.

When another vehicle or an obstacle is present in front of the vehicle, the controller 2120 may control the engine 2006 or the braking system to decrease the driving speed and may also control a trajectory, a driving route, and a steering angle in addition to the speed. Alternatively, the controller 2120 may generate a necessary control signal according to recognition information of other external environments, such as, for example, a driving lane, a driving signal, etc., of the vehicle, and may control driving of the vehicle.

The controller 2120 may also control driving of the vehicle by communicating with a nearby vehicle or a central server in addition to autonomously generating the control signal and by transmitting an instruction for controlling peripheral devices based on the received information.

Further, if a location or an angle of view of the camera module 2150 is changed, it may be difficult for the controller 2120 to accurately recognize a vehicle or a lane. To prevent this, the controller 2120 may generate a control signal for controlling a calibration of the camera module 2150. Therefore, the controller 2120 may generate a calibration control signal for the camera module 2150 and may continuously maintain a normal mounting location, direction, angle of view, etc., of the camera module 2150 regardless of a change in a mounting location of the camera module 2150 by a vibration or an impact occurring due to a motion of the autonomous vehicle 2000. When prestored information on an initial mounting location, direction, and angle of view of the camera module 2150 differs from information on the initial mounting location, direction, and angle of view of the camera module 2150 that are measured during driving of the autonomous vehicle 2000 by a threshold or more, the controller 2120 may generate a control signal for performing calibration of the camera module 2150.

The controller 2120 may include the memory 2122 and the processor 2124. The processor 2124 may execute software stored in the memory 2122 in response to the control signal of the controller 2120. In detail, the controller 2120 may store, in the memory 2122, data and instructions for detecting a visual field view from a rear view video of the vehicle 2000, and the instructions may be executed by the processor 2124 to perform one or more methods disclosed herein.

Here, the memory 2122 may be stored in a recording medium executable at the non-volatile processor 2124. The memory 2122 may store software and data through an appropriate external device. The memory 2122 may include random access memory (RAM), read only memory (ROM), hard disk, and a memory device connected to a dongle.

The memory 2122 may at least store an operating system (OS), a user application, and executable instructions. The memory 2122 may store application data and arrangement data structures.

The processor 2124 may be a controller, a microcontroller, or a state machine as a microprocessor or an appropriate electronic processor.

The processor 2124 may be configured as a combination of computing devices. The computing device may be configured as a digital signal processor, a microprocessor, or an appropriate combination thereof.

Also, the control device 2100 may monitor internal and external features of the vehicle 2000 and may detect a state of the vehicle 2000 using at least one sensor 2110.

The sensor 2110 may include at least one sensing module 2004. The sensing module 2004 may be implemented at a specific location of the vehicle 2000 depending on a sensing purpose. The sensing module 2004 may be provided in a lower portion, a rear end, a front end, an upper end, or a side end of the vehicle 2000 and may be provided to an internal part of the vehicle, a tier, and the like.

Through this, the sensing module 2004 may sense driving information, such as the engine 2006, a tier, a steering angle, a speed, a vehicle weight, and the like, as internal vehicle information. Also, the at least one sensing module 2004 may include an acceleration sensor (2110), a gyroscope, an image sensor (2110), a radar, an ultrasound sensor, a LIDAR sensor, and the like, and may sense motion information of the vehicle 2000.

The sensing module 2004 may receive specific data, such as state information of a road on which the vehicle 2000 is present, nearby vehicle information, and an external environmental state such as weather, as external information, and may sense a vehicle parameter according thereto. The sensed information may be stored in the memory 2122 temporarily or in long-term depending on purposes.

The sensor 2110 may integrate and collect information of the sensing modules 2004 for collecting information generated inside and on outside the vehicle 2000.

The control device 2100 may further include the wireless communication device 2130.

The wireless communication device 2130 is configured to implement wireless communication between the vehicles 2000. For example, the wireless communication device 2130 enables the vehicles 2000 to communicate with a mobile phone of a user, another wireless communication device 2130, another vehicle, a central device (traffic control device), a server, and the like. The wireless communication device 2130 may transmit and receive a wireless signal according to a connection communication protocol. A wireless communication protocol may be WiFi, Bluetooth, Long-Term Evolution (LTE), code division multiple access (CDMA), wideband code division multiple access (WCDMA), and global systems for mobile communications (GSM). However, it is provided as an example only and the wireless communication protocol is not limited thereto.

Also, the vehicle 2000 may implement vehicle-to-vehicle (V2V) communication through the wireless communication device 2130. That is, the wireless communication device 2130 may communicate with another vehicle and other vehicles on the roads through the V2V communication. The vehicle 2000 may transmit and receive information, such as driving warnings, traffic information, and environmental information through the V2V communication and may also request another vehicle for information or may receive a request from the other vehicle. For example, the wireless communication device 2130 may perform the V2V communication using a dedicated short-range communication (DSRC) device or a cellular-V2V (CV2V) device. Also, in addition to the V2V communication, vehicle-to-everything (V2X) communication, communication between the vehicle and another object (e.g., electronic device carried by pedestrian), may be implemented through the wireless communication device 2130.

Also, the control device 2100 may include the LIDAR device 2140. The LIDAR device 2140 may detect an object around the vehicle 2000 during an operation, based on data sensed using a LIDAR sensor. The LIDAR device 2140 may transmit detection information to the controller 2120, and the controller 2120 may operate the vehicle 2000 based on the detection information. For example, when the detection information includes a vehicle ahead driving at a low speed, the controller 2120 may instruct the vehicle to decrease a speed through the engine 2006. Alternatively, the controller 2120 may instruct the vehicle to decrease a speed based on a curvature of a curve the vehicle enters.

The control device 2100 may further include the camera module 2150. The controller 2120 may extract object information from an external image captured from the camera module 2150, and may process the extracted object information using the controller 2120.

Also, the control device 2100 may further include imaging devices configured to recognize an external environment. In addition to the LIDAR device 2140, a radar, a GPS device, a driving distance measurement device (odometry), and other computer vision devices may be used. Such devices may selectively or simultaneously operate depending on necessity, thereby enabling further precise sensing.

The vehicle 2000 may further include the user interface (UI) 2008 for a user input to the control device 2100. The user interface 2008 enables the user to input information through appropriate interaction. For example, the user interface 2008 may be configured as a touchscreen, a keypad, and a control button. The user interface 2008 may transmit an input or an instruction to the controller 2120, and the controller 2120 may perform a vehicle control operation in response to the input or the instruction.

Also, the user interface 2008 may enable communication between an external device of the vehicle 2000 and the vehicle 2000 through the wireless communication device 2130. For example, the user interface 2008 may enable interaction with a mobile phone, a tablet, or other computer devices.

Further, although the example embodiment describes that the vehicle 2000 includes the engine 2006, it is provided as an example only. The vehicle 2000 may include a different type of a propulsion system. For example, the vehicle 2000 may run with electric energy, and may run with hydrogen energy or through a hybrid system with a combination thereof. Therefore, the controller 2120 may include a propulsion mechanism according to the propulsion system of the vehicle 2000 and may provide a control signal according thereto to each component of the propulsion mechanism.

Hereinafter, a configuration of the control device 2100 of the vehicle 2000 is further described with reference to FIG. 10.

The control device 2100 may include the processor 2124. The processor 2124 may be a general-purpose single or multi-chip microprocessor, a dedicated microprocessor, a microcontroller, a programmable gate array, and the like. The processor may also be referred to as a central processing unit (CPU). Also, the processor 2124 may be a combination of a plurality of processors.

The control device 2100 also includes the memory 2122. The memory 2122 may be any electronic component capable of storing electronic information. The memory 2122 may include a combination of memories 2122 in addition to a unit memory.

According to various example embodiments, data and instructions 2122a of the vehicle 2000 may be stored in the memory 2122. When the processor 2124 executes the instructions 2122a, the instructions 2122a and a portion or all of the data 2122b required to perform command may be loaded to the processor 2124 (2124a and 2124b).

The control device 2100 may include a transmitter 2130a and a receiver 2130b, or a transceiver 2130c, to allow transmission and reception of signals. One or more antennas 2132a and 2132b may be electrically connected to the transmitter 2130a and the receiver 2130b, or the transceiver 2130c, and may include additional antennas.

The control device 2100 may include a digital signal processor (DSP) 2170, and may control the vehicle to quickly process a digital signal through the DSP 2170.

The control device 2100 may also include a communication interface 2180. The communication interface 2180 may include one or more ports and/or communication modules configured to connect other devices to the control device 2100. The communication interface 2180 may enable interaction between the user and the control device 2100.

Various components of the control device 2100 may be connected through one or more buses 2190, and the buses 2190 may include a power bus, a control signal bus, a state signal bus, and a database bus. The components may forward mutual information through the buses 2190 under control of the processor 2124 and may perform desired functions.

The apparatuses described herein may be implemented using hardware components, software components, and/or a combination of the hardware components and the software components. For example, the apparatuses and the components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that the processing device may include multiple processing elements and/or multiple types of processing elements. For example, the processing device may include multiple processors or a processor and a controller. In addition, other processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, computer storage medium or device, to provide instructions or data to the processing device or be interpreted by the processing device. The software also may be distributed over network coupled computer systems so that the software is stored and executed in a distributed fashion. The software and data may be stored by one or more computer readable storage mediums.

The methods according to various example embodiments may be implemented in a form of a program instruction executable through various computer methods and recorded in computer-readable media. Here, the media may be to continuously store a computer-executable program or to temporarily store the same for execution or download. The media may be various types of record methods or storage methods in which a single piece of hardware or a plurality of pieces of hardware are combined and may be distributed over a network without being limited to a medium that is directly connected to a computer system. Examples of the media include magnetic media such as hard disks, floppy disks, and magnetic tapes; optical media such as CD ROM and DVD; magneto-optical media such as floptical disks; and hardware devices that are specially configured to store and perform program instructions, such as read-only memory (ROM), random access memory (RAM), flash memory, and the like. Examples of other media may include recording media and storage media managed by an app store that distributes applications or a site, a server, and the like that supplies and distributes other various types of software.

Various example embodiments and the terms used herein are not construed to limit description disclosed herein to a specific implementation and should be understood to include various modifications, equivalents, and/or substitutions of a corresponding example embodiment. In the drawings, like reference numerals refer to like components throughout the present specification. The singular forms "a," "an," and "the" are intended to include the plural forms as well, unless the context clearly indicates otherwise. Herein, the expressions, "A or B," "at least one of A and/or B," "A, B, or C," "at least one of A, B, and/or C," and the like may include any possible combinations of listed items. Terms "first," "second," etc., are used to describe corresponding components regardless of order or importance and the terms are simply used to distinguish one component from another component. The components should not be limited by the terms. When a component (e.g., first component) is described to be "(functionally or communicatively) connected to" or "accessed to" another component (e.g., second component), the component may be directly connected to the other component or may be connected through still another component (e.g., third component).

The term "module" used herein may include a unit configured as hardware, software, or firmware, and may be interchangeably used with the terms, for example, "logic," "logic block," "part," "circuit," etc. The module may be an integrally configured part, a minimum unit that performs one or more functions, or a portion thereof. For example, the module may be configured as an application-specific integrated circuit (ASIC).

According to various example embodiments, each of the components (e.g., module or program) may include a singular object or a plurality of objects. According to various example embodiments, at least one of the components or operations may be omitted. Alternatively, at least one another component or operation may be added. Alternatively or additionally, a plurality of components (e.g., modules or programs) may be integrated into a single component. In this case, the integrated component may perform one or more functions of each of the components in the same or similar manner as it is performed by a corresponding component before integration. According to various example embodiments, operations performed by a module, a program, or another component may be performed in a sequential, parallel, iterative, or heuristic manner. Alternatively, at least one of the operations may be performed in different sequence or omitted. Alternatively, at least one another operation may be added.

What is claimed is:

1. A digital rear mirror device of a vehicle, comprising:
a digital rear mirror module configured to provide a rear view of the vehicle through a display module, wherein the digital rear mirror module is connected to at least one rear camera device mounted to the vehicle;
an electronic toll collection system (ETCS) module arranged separate from the digital rear mirror module within the digital rear mirror device and configured for electronic toll collection for the vehicle; and
at least one front camera device mounted to the vehicle for capturing front view video of an area in front of the vehicle;
wherein
the digital rear mirror module is configured to detect toll collection lanes among lanes in front of the vehicle based on the front view video captured by the front camera device, and to display lane information on the detected toll collection lanes through the display module,
the ETCS module is mounted on a separate substrate from the digital rear mirror module,
the digital rear mirror module includes a first substrate and a plurality of first components mounted on the first substrate,
the first components include the display module, the first substrate is provided on a portion of the back of the display module, the ETCS module includes a second substrate and a plurality of second components mounted on the second substrate, the second substrate is provided on a remaining portion of the back of the display module, the ETCS module is configured to transmit information received from an external device to the digital rear mirror module, the digital rear mirror module is configured to display the information received from the external device while providing the rear view through the display module, and the external device includes an ETCS relay device that is installed at a predetermined location, capable of communicating with the ETCS module as the vehicle passes through the location, and connected to an ETCS server for executing the electronic toll collection.

2. The digital rear mirror device of claim 1, wherein the information received from the external device includes at least one of billing information, event information, traffic information, environmental information, and disaster situation information.

3. The digital rear mirror device of claim 1, wherein the digital rear mirror module is configured to provide the rear view by displaying a rear view video of the vehicle captured by the camera device through the display module.

4. The digital rear mirror device of claim 3, wherein the digital rear mirror module is configured to switch between a mirror mode for directly illuminating the rear view through the display module and a display mode for providing the rear view by displaying the rear view video.

5. The digital rear mirror device of claim 1, wherein the second components include a memory that stores a virtual card having card information used for the electronic toll collection.

6. The digital rear mirror device of claim 1, wherein the second components include at least one connection module configured to connect to a physical card that has card information used for the electronic toll collection and inserts into the digital rear mirror device.

7. An operating method of a digital rear mirror device of a vehicle, the method comprising:

providing, by a digital rear mirror module, a rear view of the vehicle through a display module, wherein the digital rear mirror module is connected to at least one rear camera device mounted to the vehicle; and supporting, by an electronic toll collection system (ETCS) module arranged separate from the digital rear mirror module within the digital rear mirror device, electronic toll collection for the vehicle, wherein the digital rear mirror module is connected to at least one front camera device mounted to the vehicle for capturing front view video of an area in front of the vehicle, wherein the method further comprises:

detecting, by the digital rear mirror module, toll collection lanes among lanes in front of the vehicle based on the front view video captured by the front camera device;

displaying, through the display module, lane information on the detected toll collection lanes, and wherein the ETCS module is mounted on a separate substrate from the digital rear mirror module;

transmitting, by the ETCS module, information received from an external device to the digital rear mirror module; and displaying, by the digital rear mirror module, the information while providing the rear view through the display module, wherein the digital rear mirror module includes a first substrate and a plurality of first components mounted on the first substrate, the first components include the display module, the first substrate is provided on a portion of the back of the display module, the ETCS module includes a second substrate and a plurality of second components mounted on the second substrate, the second substrate is provided on a remaining portion of the back of the display module, the external device includes an ETCS relay device that is installed at a predetermined location and connected to an ETCS server for executing the electronic toll collection, and the supporting the electronic toll collection comprises performing, by the ETCS module, payment for the electronic toll collection executed by the ETCS server through communication with the ETCS relay device, when the vehicle passes through the location.

8. The method of claim 7, wherein the information received from the external device includes at least one of billing information, event information, traffic information, environmental information, and disaster situation information.

9. The method of claim 7, wherein the providing the rear view comprises providing, by the digital rear mirror module, the rear view by displaying a rear view video of the vehicle captured by the camera device through the display module in a display mode.

10. The method of claim 9, wherein the providing the rear view further comprises:

directly illuminating, by the digital rear mirror module, the rear view through the display module in a mirror mode; and switching, by the digital rear mirror module, between the display mode and the mirror mode.

11. The method of claim 7, wherein the second components include a memory that stores a virtual card having card information used for the electronic toll collection.

12. The method of claim 7, wherein the second components include at least one connection module configured to connect to a physical card that has card information used for the electronic toll collection and inserts into the digital rear mirror device.

* * * * *